(12) United States Patent
Torita

(10) Patent No.: US 11,095,811 B2
(45) Date of Patent: Aug. 17, 2021

(54) IMAGING APPARATUS AND IMAGE-CAPTURING CONTROL METHOD

(71) Applicant: SONY CORPORATION, Tokyo (JP)

(72) Inventor: Ryosuke Torita, Kanagawa (JP)

(73) Assignee: SONY COROPRATION, Tokyo (JP)

( * ) Notice: Subject to any disclaimer, the term of this patent is extended or adjusted under 35 U.S.C. 154(b) by 0 days.

(21) Appl. No.: 16/495,155

(22) PCT Filed: Jan. 22, 2018

(86) PCT No.: PCT/JP2018/001783
§ 371 (c)(1),
(2) Date: Sep. 18, 2019

(87) PCT Pub. No.: WO2018/179710
PCT Pub. Date: Oct. 4, 2018

(65) Prior Publication Data
US 2020/0021735 A1  Jan. 16, 2020

(30) Foreign Application Priority Data
Mar. 30, 2017 (JP) .............................. JP2017-067661

(51) Int. Cl.
*H04N 5/232* (2006.01)
(52) U.S. Cl.
CPC ..... *H04N 5/23227* (2018.08); *H04N 5/23293* (2013.01)
(58) Field of Classification Search
CPC ........... H04N 5/23227; H04N 5/23293; H04N 5/2353; G03B 15/00
See application file for complete search history.

(56) References Cited

U.S. PATENT DOCUMENTS

2005/0237421 A1\* 10/2005 Kosugiyama .......... G03B 19/12
348/360
2007/0263106 A1   11/2007 Tanaka et al.
(Continued)

FOREIGN PATENT DOCUMENTS

| JP | 02-75281 A | 3/1990 |
|---|---|---|
| JP | 2002-199288 A | 7/2002 |
| JP | 2007-300410 A | 11/2007 |

OTHER PUBLICATIONS

International Search Report and Written Opinion of PCT Application No. PCT/JP2018/001783, dated Mar. 13, 2018, 7 pages of ISRWO.

*Primary Examiner* — Lin Ye
*Assistant Examiner* — John H Morehead, III
(74) *Attorney, Agent, or Firm* — Chip Law Group

(57) ABSTRACT

Provided is an apparatus and method that enable capturing of an image according to a timing of image-capturing operation by making a release time lag constant. The apparatus includes an imaging element and a control unit that performs output control of a synchronization signal that defines processing timing of the imaging element, in which the control unit outputs a first additional synchronization signal to the imaging element at an end timing of exposure preparation processing started in response to image-capturing operation. The imaging element starts exposure processing of a captured image corresponding to the image-capturing operation in response to input of the first additional synchronization signal.

13 Claims, 12 Drawing Sheets

(56) References Cited

U.S. PATENT DOCUMENTS

| | | | |
|---|---|---|---|
| 2013/0010170 A1* | 1/2013 | Matsuzawa | G06F 3/04817 348/333.01 |
| 2013/0329090 A1* | 12/2013 | Ise | H04N 5/2621 348/240.99 |
| 2016/0028934 A1* | 1/2016 | Sugawara | H04N 5/2353 348/226.1 |

* cited by examiner

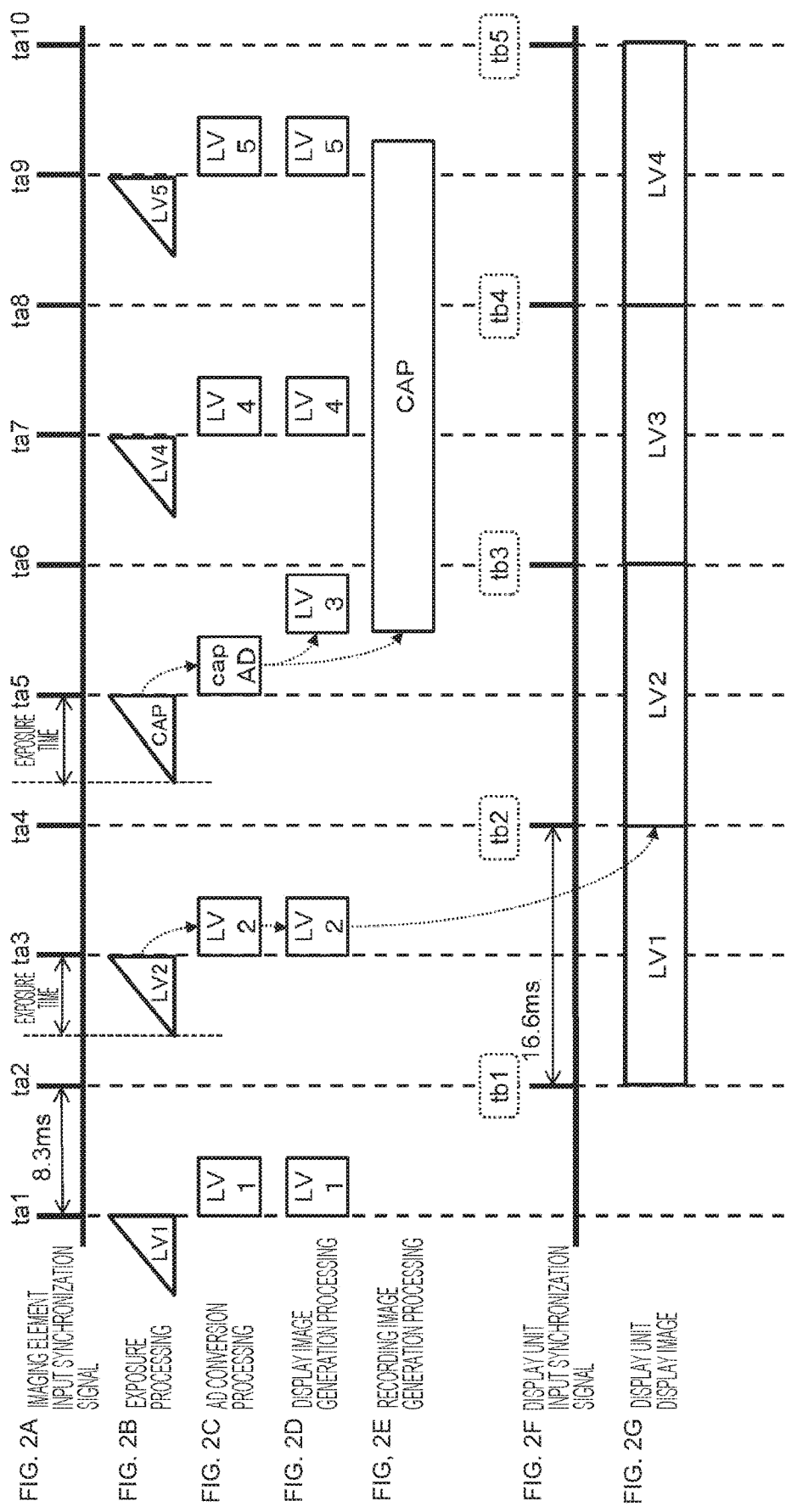

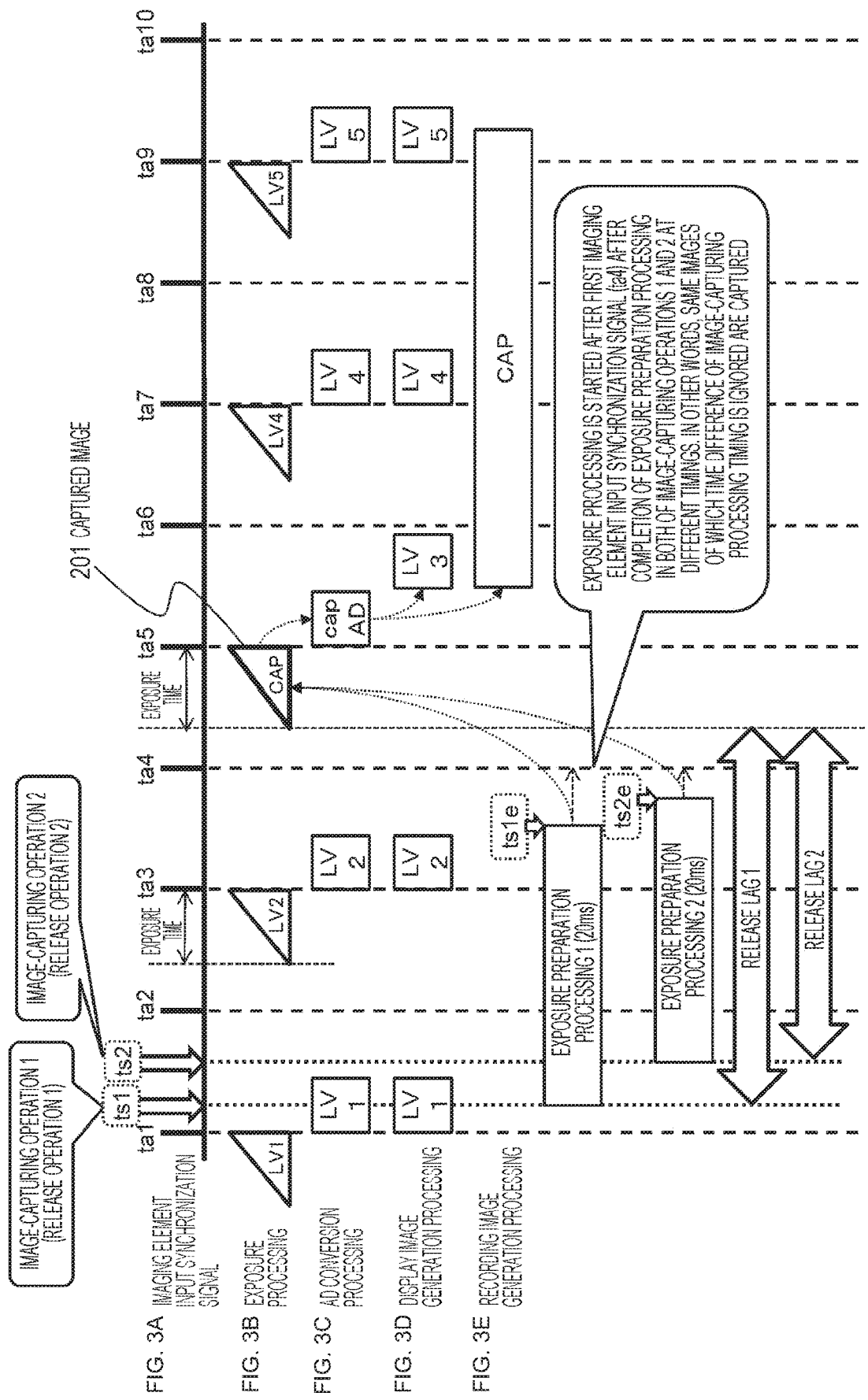

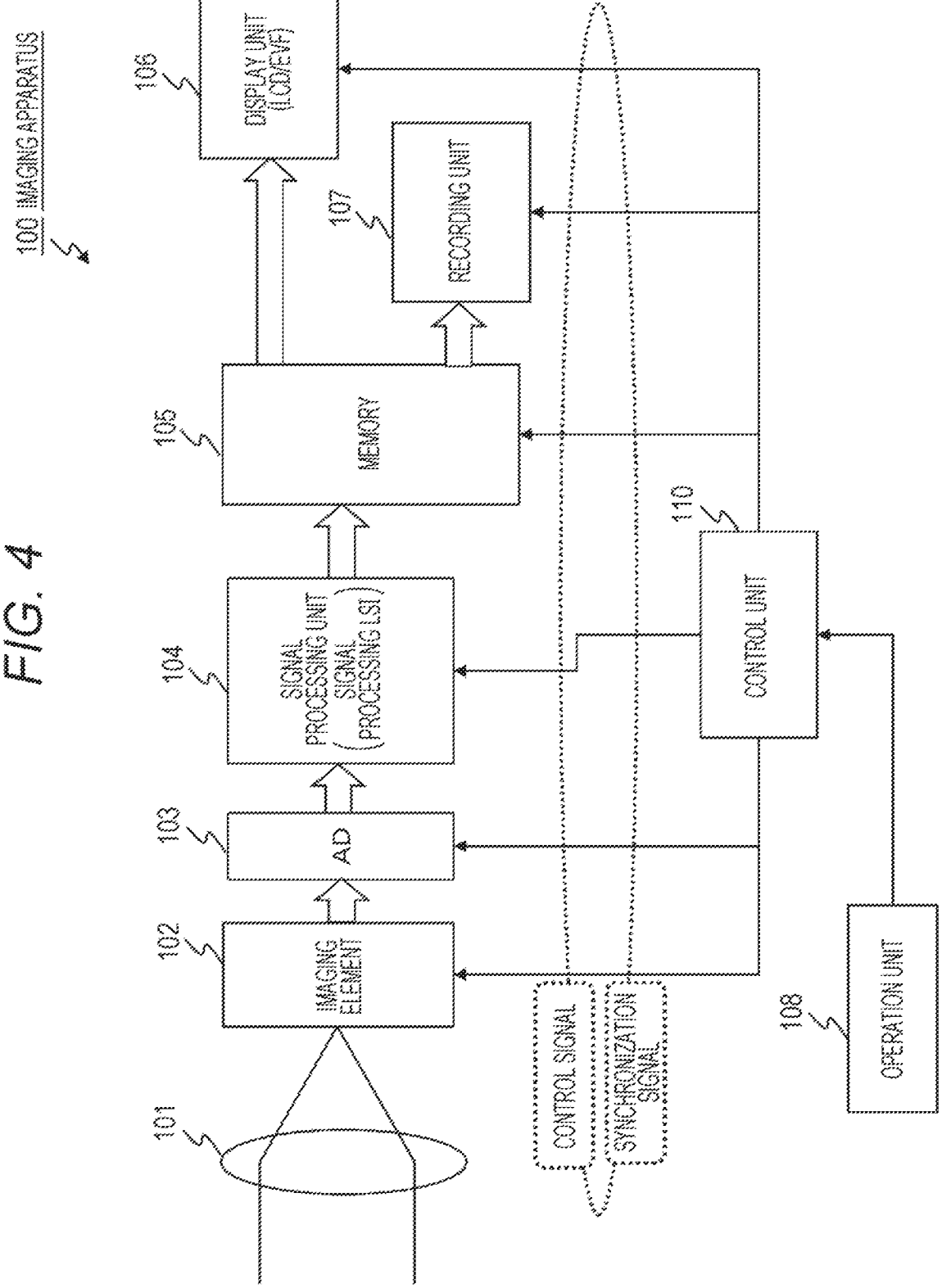

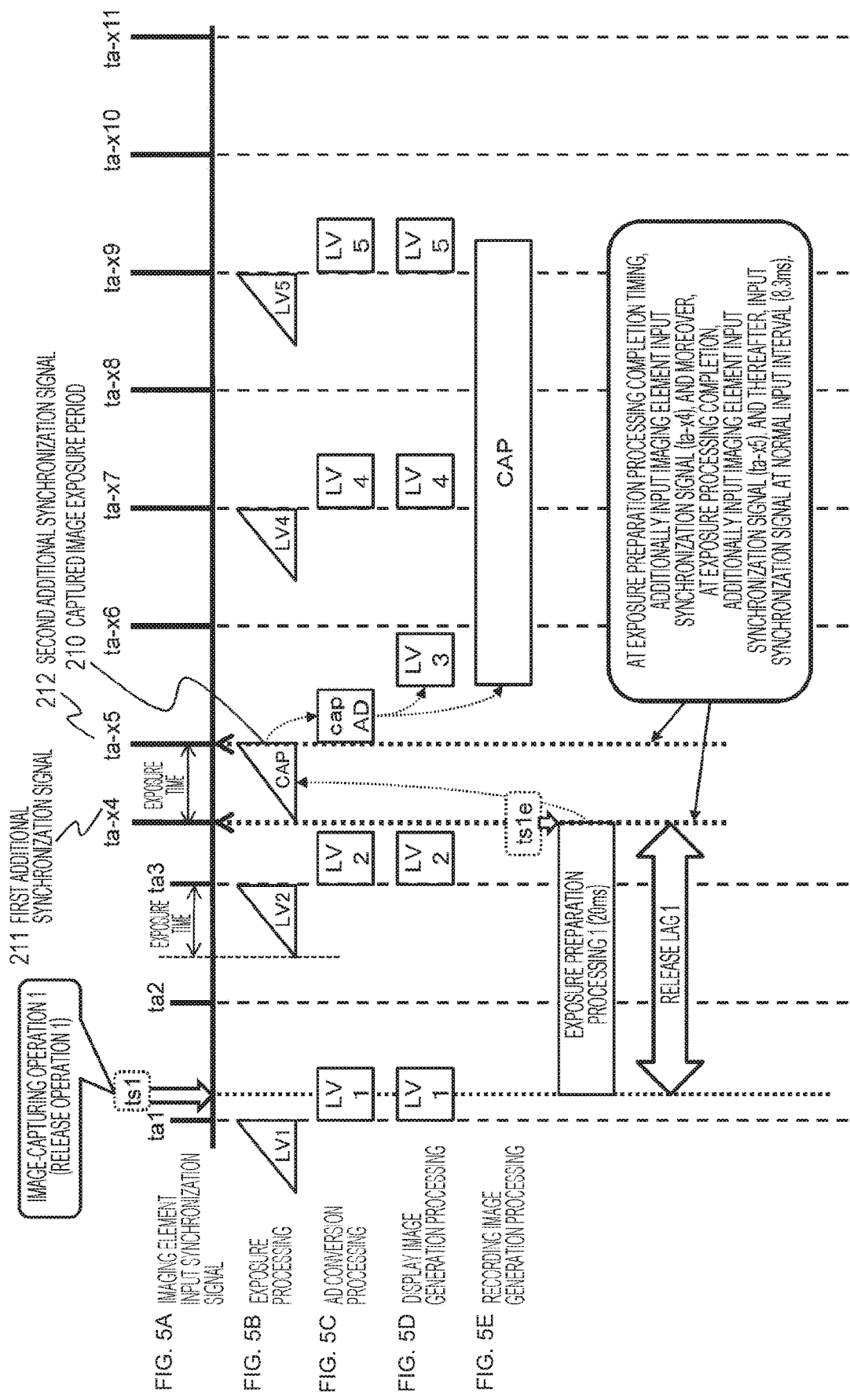

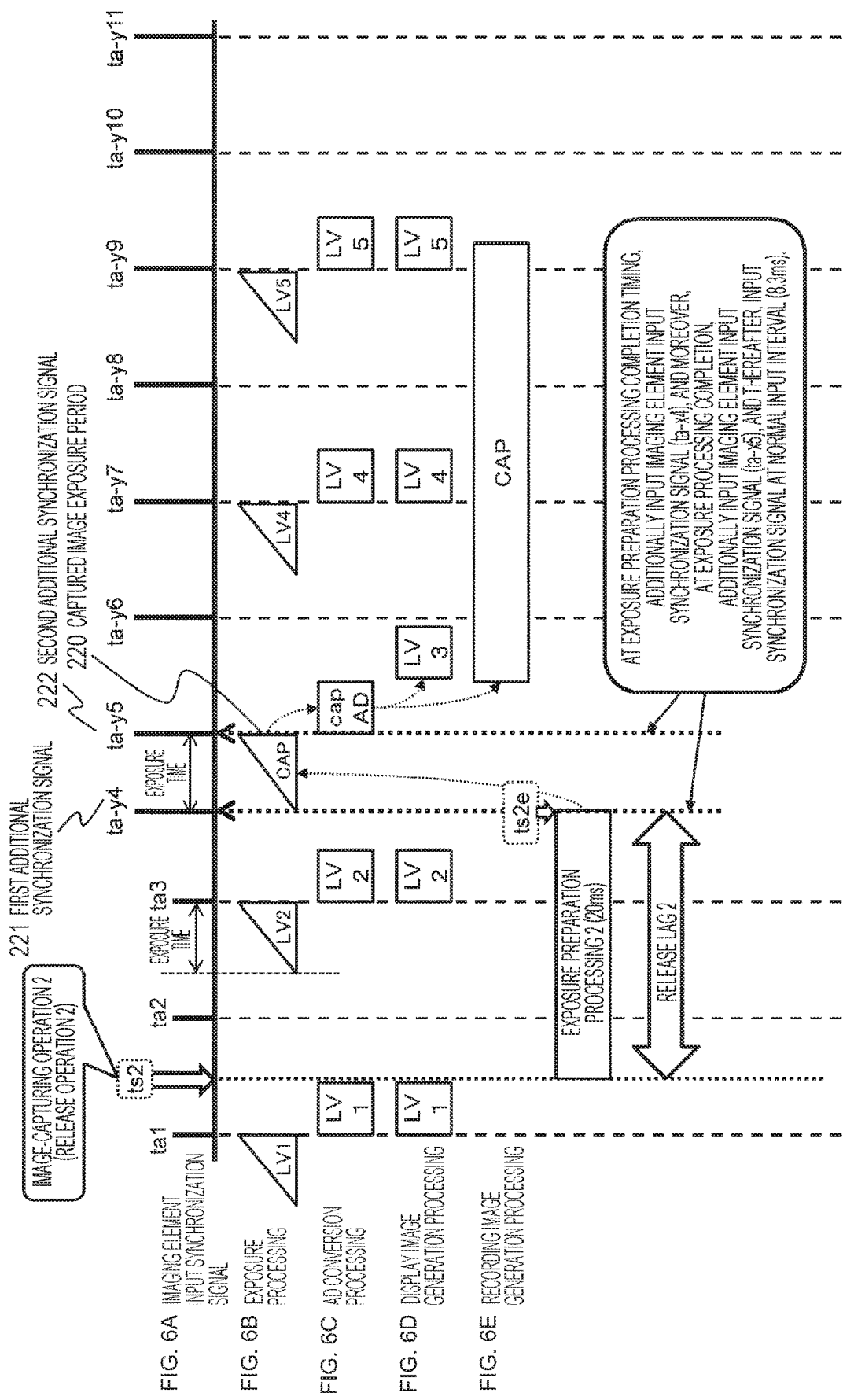

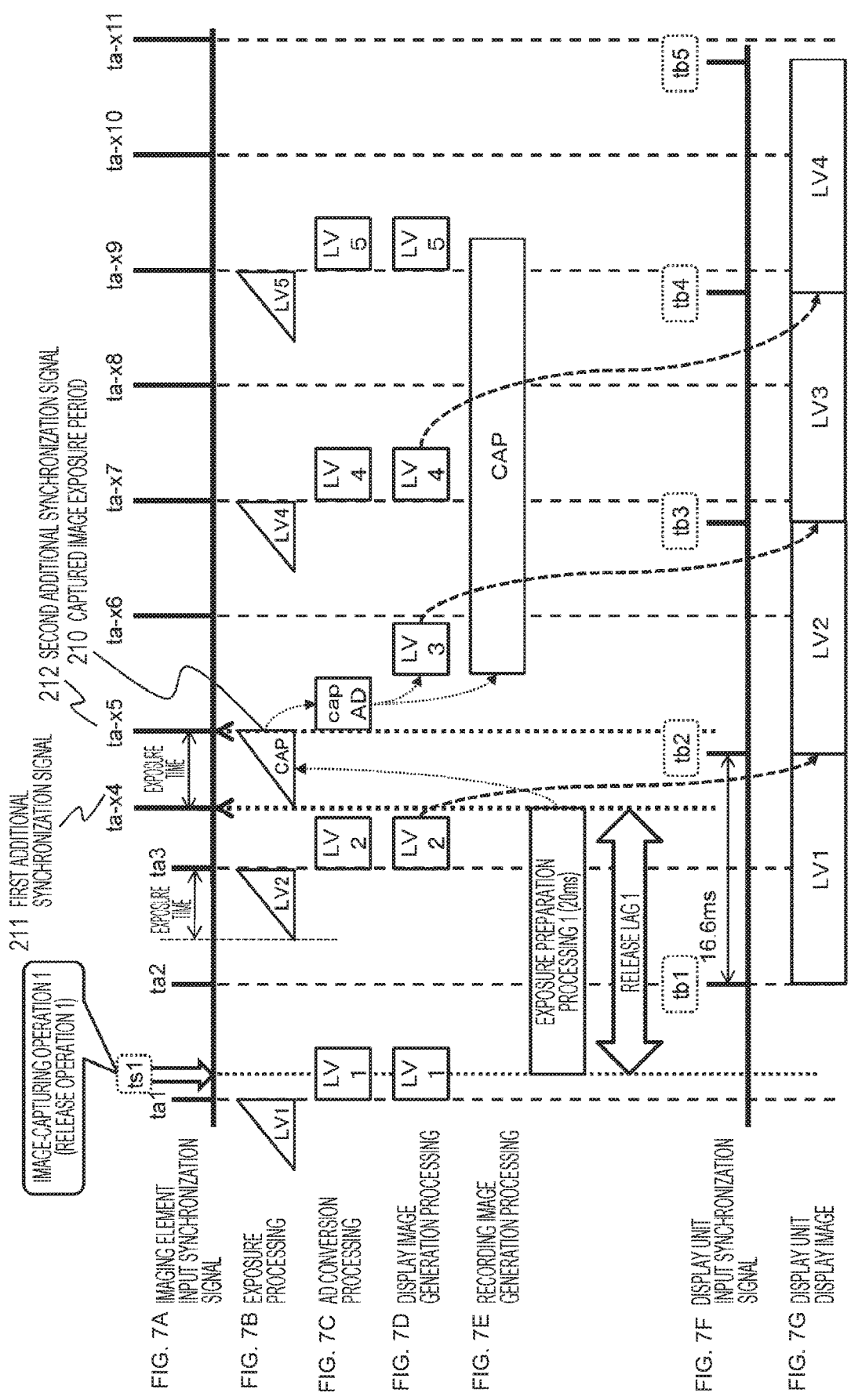

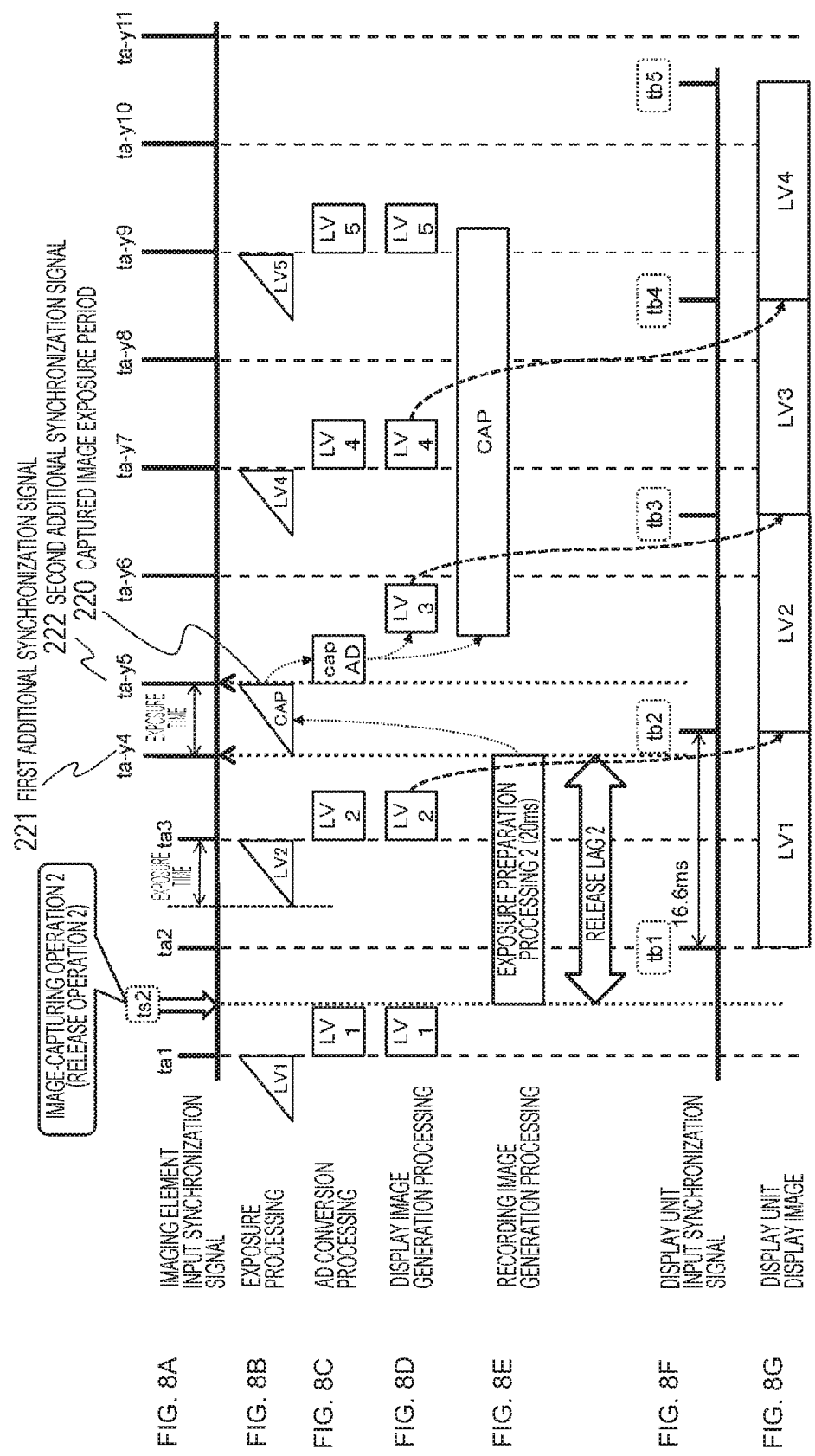

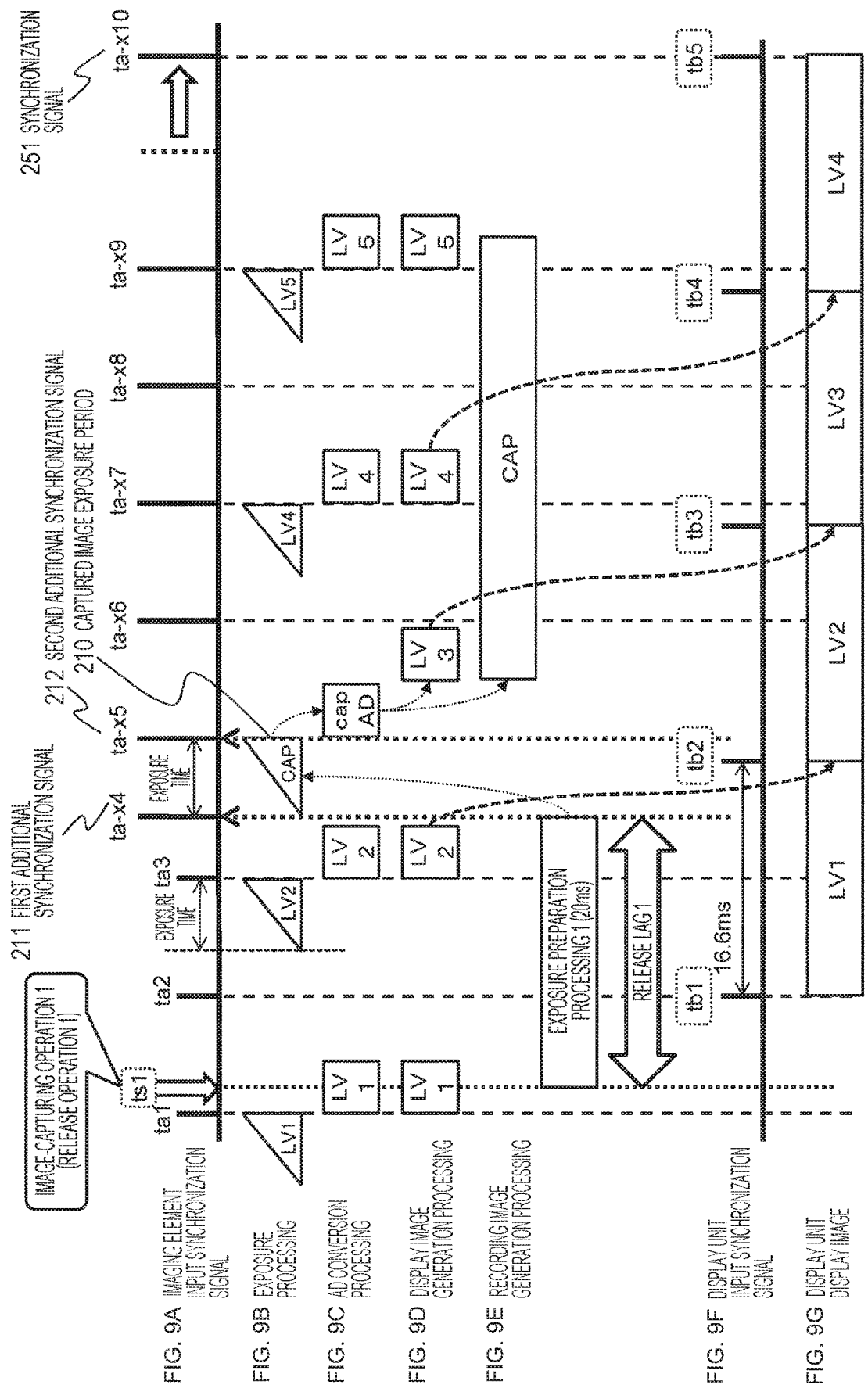

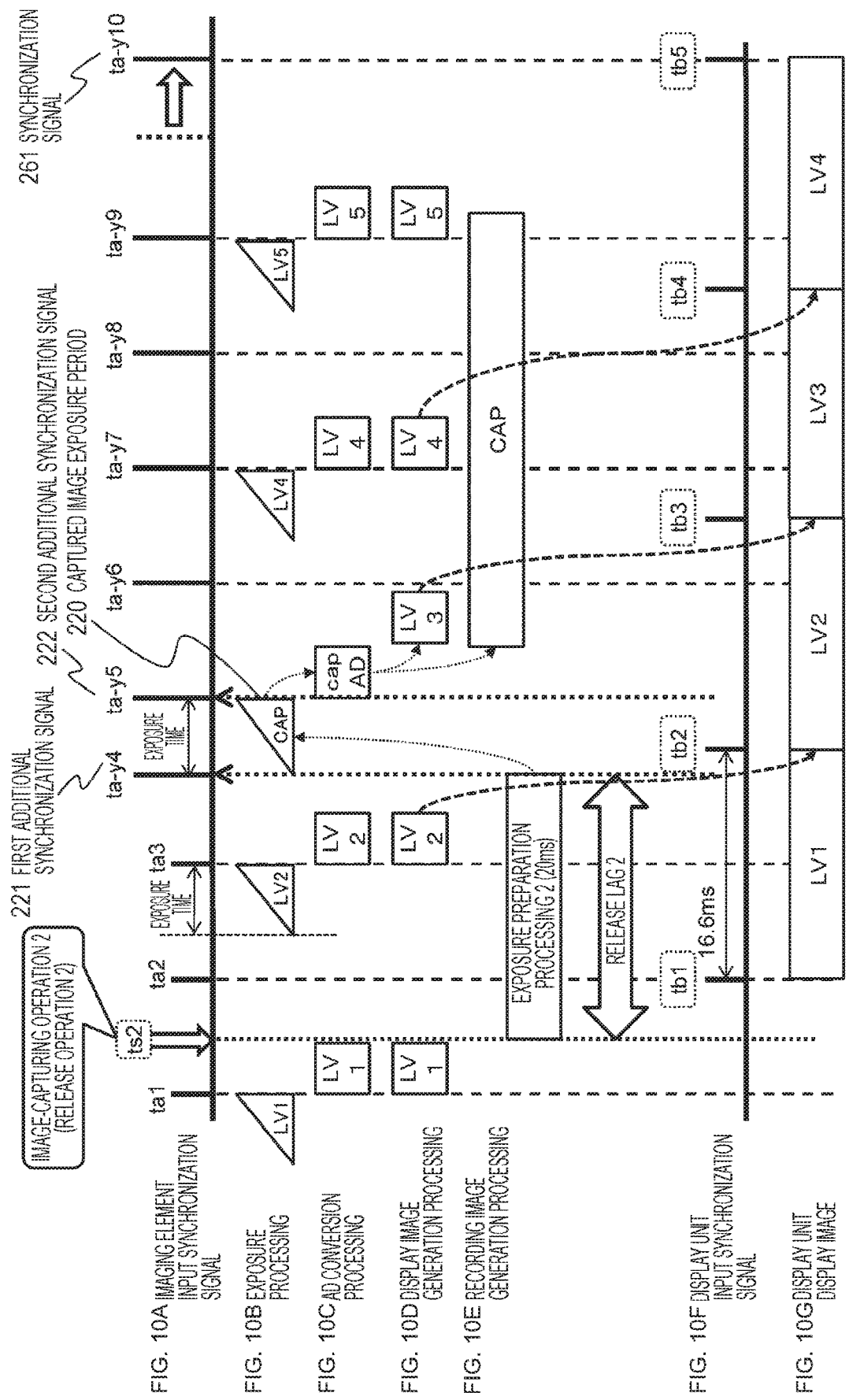

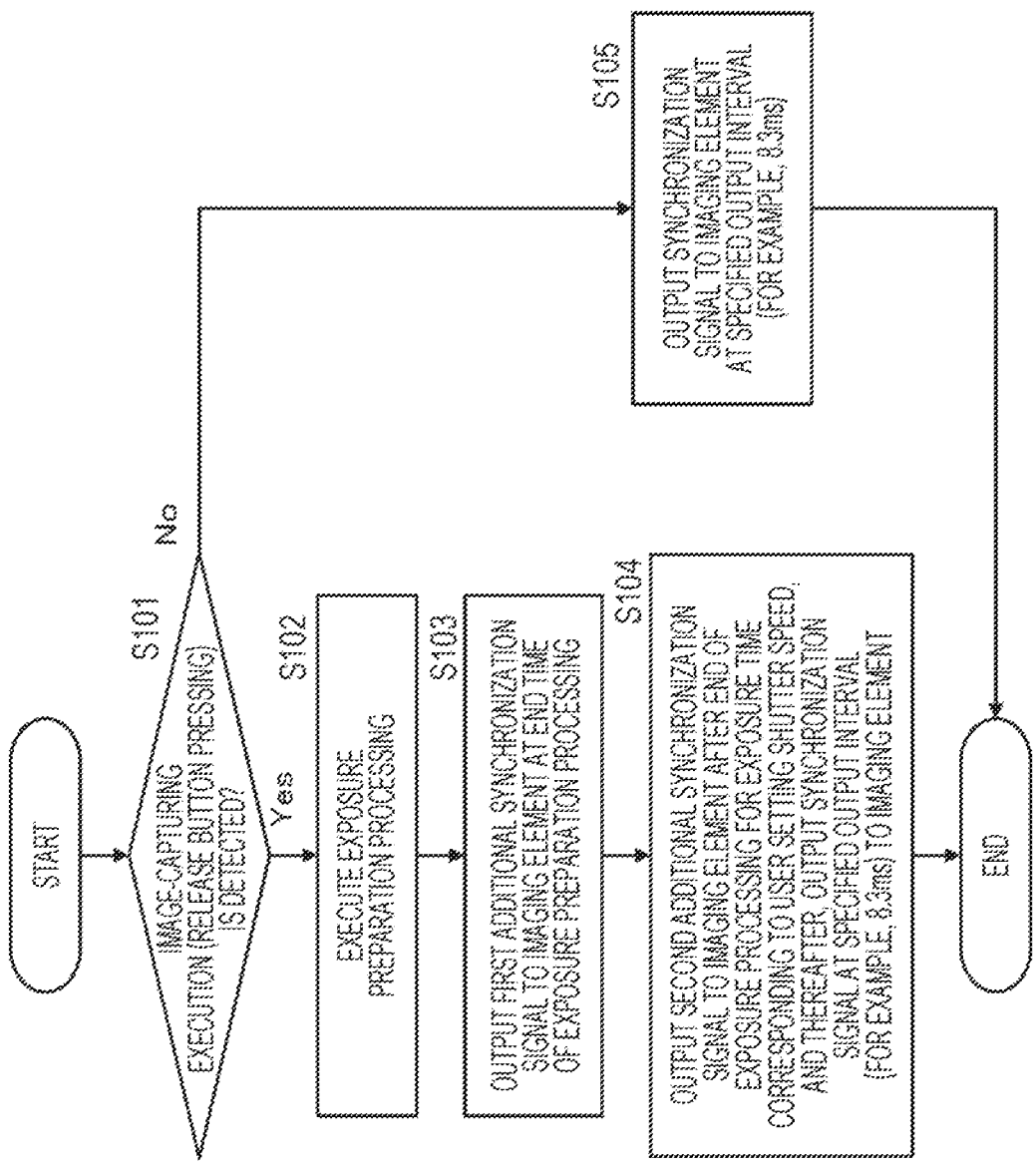

IMAGING APPARATUS AND IMAGE-CAPTURING CONTROL METHOD

CROSS REFERENCE TO RELATED APPLICATIONS

This application is a U.S. National Phase of International Patent Application No. PCT/JP2018/001783 filed on Jan. 22, 2018, which claims priority benefit of Japanese Patent Application No. JP 2017-067661 filed in the Japan Patent Office on Mar. 30, 2017. Each of the above-referenced applications is hereby incorporated herein by reference in its entirety.

TECHNICAL FIELD

The present disclosure relates to an imaging apparatus, an image-capturing control method, and a program. In particular, the present disclosure relates to an imaging apparatus, an image-capturing control method, and a program enabled to capture and record an image according to an image-capturing timing.

BACKGROUND ART

In a case where image capturing is performed by using a camera (imaging apparatus), for example, an image-capturing person confirms an image displayed on a display unit such as an LCD display unit or an electric view finder (EVF) of the camera, determines an image-capturing timing, and presses a release button (shutter button).

However, there is a certain time lag (time delay) until the release button (shutter button) is pressed and the exposure processing of the imaging element of the camera is actually started.

This time lag is called a release time lag or a release lag. Although there is a slight difference in the release lag depending on the camera, the release lag is in a time range of about 15 msec to 30 msec in many cameras.

Note that, for example, Patent Document 1 (Japanese Patent Application Laid-Open No. 2008-141236) is given as a prior art disclosing a release lag.

In a case where a stationary subject not moving is image-captured, no significant change occurs between the subject at the timing when the release button (shutter button) is pressed and the subject after the lapse of the release lag, so that a subject image intended by the image-capturing person can be recorded as a recorded image in the memory of the camera.

However, for example, in a case where a subject moving at high speed is image-captured, the subject at the timing when the release button (shutter button) is pressed may be largely different from the subject after the lapse of the release lag. In such a case, an image different from the subject image intended by the image-capturing person is recorded in the memory of the camera.

A general user performs image capturing without paying attention to the release lag, but for example, a professional image-capturing person or the like often performs image-capturing processing in consideration of the release lag of the camera used. In other words, the display image of the display unit such as the LCD display unit or the electric view finder (EVF) of the camera is confirmed, and moreover, the release lag is considered, and then the release button (shutter button) is pressed at a pressing timing.

Specifically, image-capturing processing is performed in which the display image of the display unit of the camera is confirmed, and moreover, an image after the lapse of the release lag is estimated, and then the release button (shutter button) is pressed at a timing immediately before the image estimated so that the image estimated can be captured.

However, to capture an image assumed by the image-capturing person by controlling the pressing timing of the release button (shutter button) in this way is under the condition that the time of the release lag is always constant.

However, in practice, the time of the release lag may differ depending on the pressing timing of the release button.

This is because, for example, the processing timing of the imaging element is defined by synchronization signals at regular intervals.

CITATION LIST

Patent Document

Patent Document 1: Japanese Patent Application Laid-Open No. 2008-141236

SUMMARY OF THE INVENTION

Problems to be Solved by the Invention

The present disclosure has been made, for example, in view of the above problems, and it is an object to provide an imaging apparatus, an image-capturing control method, and a program enabled to capture an image in which the pressing timing of the release button (shutter button) is reliably reflected.

In other words, it is an object to provide an imaging apparatus, an image-capturing control method, and a program that reliably starts exposure processing after the lapse of a certain fixed period from the pressing timing of the release button (shutter button).

Solutions to Problems

The first aspect of the present disclosure is in
an imaging apparatus including:
an imaging element; and
a control unit that performs output control of a synchronization signal that defines a processing timing of the imaging element, in which
the control unit
performs control to output a first additional synchronization signal to the imaging element at an end timing of exposure preparation processing started in response to image-capturing operation, and
the imaging element starts exposure processing of a captured image corresponding to the image-capturing operation in response to input of the first additional synchronization signal.

Moreover, a second aspect of the present disclosure is in
an image-capturing control method to be executed in an imaging apparatus,
the imaging apparatus including
an imaging element, and
a control unit that performs output control of a synchronization signal that defines a processing timing of the imaging element,
the image-capturing control method including:
by the control unit,
performing control to output a first additional synchronization signal to the imaging element at an end timing of exposure preparation processing started in response to image-capturing operation; and by the imaging element, starting exposure processing of a captured image corresponding to the image-capturing operation in response to input of the first additional synchronization signal.

Moreover, the third aspect of the present disclosure is in a program that causes an imaging apparatus to execute image-capturing control processing, the imaging apparatus including an imaging element, and a control unit that performs output control of a synchronization signal that defines a processing timing of the imaging element, the program: causing the control unit to perform control to output a first additional synchronization signal to the imaging element at an end timing of exposure preparation processing started in response to image-capturing operation; and causing the imaging element to start exposure processing of a captured image corresponding to the image-capturing operation in response to input of the first additional synchronization signal.

Note that, the program of the present disclosure is, for example, a program that can be provided by a communication medium or a storage medium provided in a computer readable form to a computer system or an information processing device that can execute various program codes. By providing such a program in a computer readable form, processing is implemented according to the program on the information processing device or the computer system.

Still other objects, features and advantages of the present disclosure will become apparent from the detailed description based on embodiments of the present disclosure and attached drawings to be described later. Note that, in this specification, the term "system" refers to a logical group configuration of a plurality of devices, and is not limited to a system in which the devices of respective configurations are in the same housing.

Effects of the Invention

According to a configuration of an embodiment of the present disclosure, an apparatus and a method are implemented that enable capturing of an image according to a timing of image-capturing operation by making a release time lag constant.

Specifically, for example, the apparatus includes: an imaging element; and a control unit that performs output control of a synchronization signal that defines processing timing of the imaging element, in which the control unit outputs a first additional synchronization signal to the imaging element at an end timing of exposure preparation processing started in response to image-capturing operation. The imaging element starts exposure processing of a captured image corresponding to the image-capturing operation in response to input of the first additional synchronization signal. Moreover, the control unit outputs a second additional synchronization signal to the imaging element at an end timing of a period of exposure of the exposure processing of the captured image, and the imaging element starts output of a photoelectric conversion signal obtained by the exposure processing in response to input of the second additional synchronization signal.

With these pieces of processing, the apparatus and the method are implemented that enable capturing of an image according to a timing of image-capturing operation by making a release time lag constant.

Note that, the advantageous effects described in this specification are merely examples, and the advantageous effects of the present technology are not limited to them and may include additional effects.

BRIEF DESCRIPTION OF DRAWINGS

FIGS. 2A, 2B, 2C, 2D, 2E, 2F, and 2G are diagrams illustrating a timing chart illustrating a processing sequence in a case where an image for displaying (LV image) is displayed on a display unit of the imaging apparatus, and during the display, image-capturing processing is performed, and recording processing of an image for recording (CAP image) is performed.

FIGS. 3A, 3B, 3C, 3D, and 3E are diagrams illustrating a problem that a release lag changes depending on an image-capturing timing.

FIG. 4 is a diagram illustrating a configuration example of the imaging apparatus.

FIGS. 5A, 5B, 5C, 5D, and 5E are diagrams illustrating a generation sequence of the image for recording (CAP image) in a case where the image-capturing processing is executed.

FIGS. 6A, 6B, 6C, 6D, and 6E are diagrams illustrating the generation sequence of the image for recording (CAP image) in a case where the image-capturing processing is executed.

FIGS. 7A, 7B, 7C, 7D, 7E, 7F, and 7G are diagrams illustrating generation of the image for recording (CAP image) and an image display sequence in a case where the image-capturing processing is executed.

FIGS. 8A, 8B, 8C, 8D, 8E, 8F, and 8G are diagrams illustrating generation of the image for recording (CAP image) and an image display sequence in a case where the image-capturing processing is executed.

FIGS. 9A, 9B, 9C, 9D, 9E, 9F, and 9G are diagrams illustrating generation of the image for recording (CAP image) and an image display sequence in a case where the image-capturing processing is executed.

FIGS. 10A, 10B, 10C, 10D, 10E, 10F, and 10G are diagrams illustrating generation of the image for recording (CAP image) and an image display sequence in a case where the image-capturing processing is executed.

FIG. 11 is a flowchart illustrating a processing sequence executed by the imaging apparatus.

MODE FOR CARRYING OUT THE INVENTION

Figure 1A:
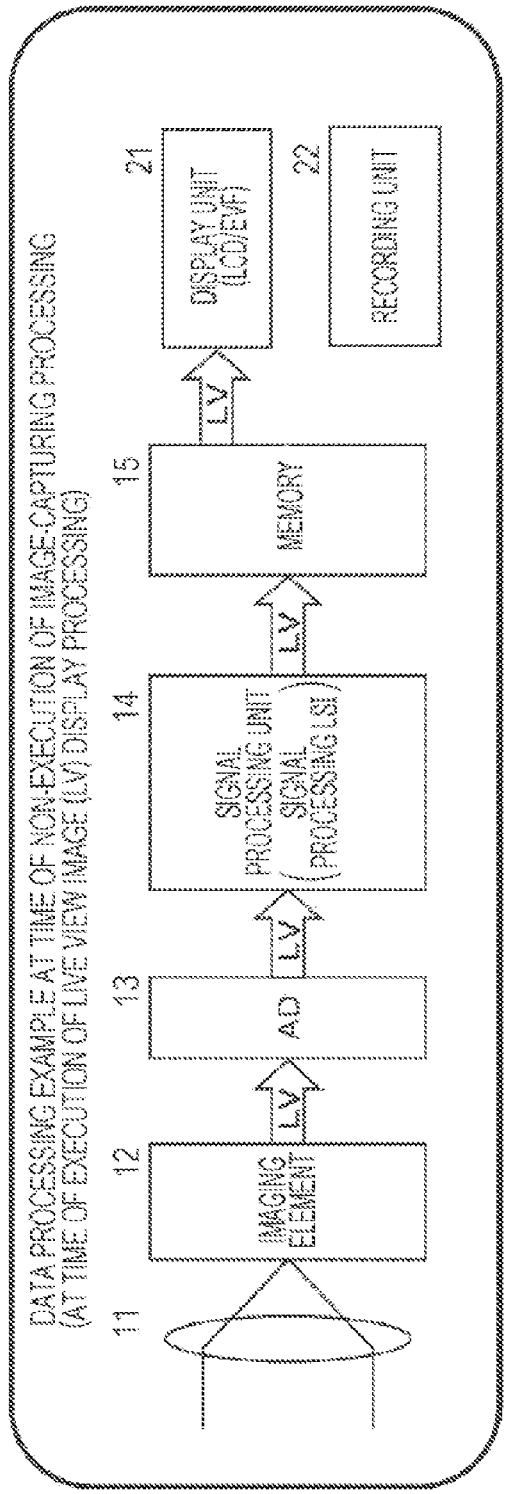
FIGS. 1A and 1B are diagrams illustrating a data processing sequence in image capturing, display processing, and recording processing of an image in an imaging apparatus.

Hereinafter, with reference to the drawings, details will be described of an imaging apparatus, an image-capturing control method, and a program of the present disclosure. Note that, the description will be made in accordance with the following items.

1. Overview of image capturing, display processing, and recording processing of image in imaging apparatus 2. Problem that release lag changes depending on image-capturing timing 3. Embodiment in which acquisition of captured image according to image-capturing execution timing is enabled 4. Sequence of processing executed by imaging apparatus 5. Other embodiments
6. Summary of configuration of present disclosure

[1. Overview of Image Capturing, Display Processing, and Recording Processing of Image in Imaging Apparatus]

First, with reference to FIGS. 1A and 1B and subsequent drawings, an overview will be described of image capturing, display processing, and recording processing of an image in an imaging apparatus.

Figure 1B:
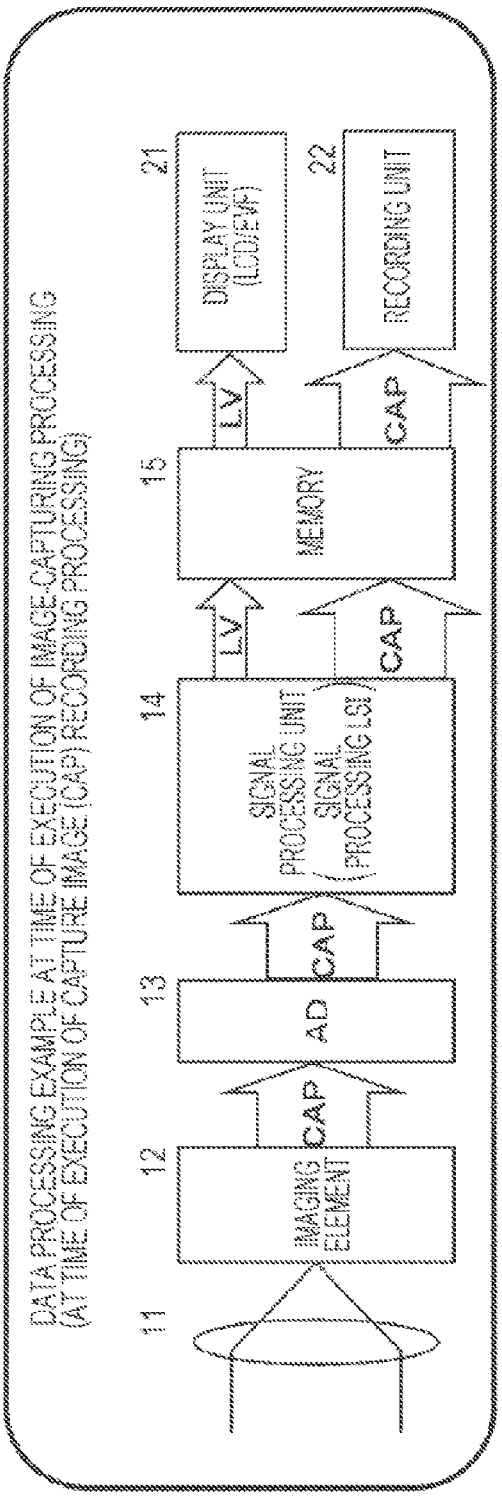

FIGS. 1A and 1B illustrate the following processing examples in the imaging apparatus.

FIG. 1A Data processing example at time of non-execution of image-capturing processing (at time of execution of live view image (LV) display processing)

FIG. 1B Data processing example at time of execution of image-capturing processing (at time of execution of capture image (CAP) recording processing)

Note that, the live view image (LV) is an image displayed on a display unit of the imaging apparatus, for example, an LCD, an EVF, or the like, which can be confirmed by an image-capturing person. It is also called a through image, and is an image continuously displayed on the display unit regardless of execution or non-execution of image-capturing processing.

On the other hand, the capture image (CAP) is an image captured by the image-capturing person operating the release button (shutter button) of the imaging apparatus. The captured image (CAP) is recorded in a recording unit (medium) of the imaging measure.

Note that, generally, the capture image (CAP) is acquired and recorded as a high resolution image having a high number of pixels reflecting the number of pixels of the imaging element, but the live view image (LV) is acquired and displayed as an image having a low number of pixels according to the number of pixels that can be displayed on the display unit.

In other words, the live view image (LV) is an image having a lower number of pixels than those of the capture image (CAP).

Description will be made for the FIG. 1A, data processing example at time of non-execution of image-capturing processing (at time of execution of live view image (LV) display processing).

Light incident through an optical lens 11 is incident on an imaging unit, for example, an imaging element 12 including a CMOS image sensor or the like, and image data obtained by photoelectric conversion is output. Note that, an output image in this case is an image for displaying (LV image) to be displayed on a display unit 21.

Hereinafter, an image to be displayed on the display unit is referred to as an image for displaying or an LV image, while an image for image-capturing recording is referred to as an image for recording, a capture image, or a CAP image.

When outputting the image for displaying (LV image) to be displayed on the display unit, the imaging element 12 outputs an image having a low number of pixels partially thinned out without outputting all pixel data of the imaging element.

In a case where the image-capturing processing is executed, it is necessary to generate an image for recording having a high number of pixels, so that almost all pixel data of the imaging element is output.

At time of FIG. 1A, non-execution of image-capturing processing (at time of execution of live view image (LV) display processing), the imaging element 12 inputs an output image (LV image) having a low number of pixels to an AD conversion unit 13.

The AD conversion unit 13 executes A/D conversion of an input signal, in other words, processing of converting an analog signal into a digital signal, and inputs a digital value after conversion to a signal processing unit (signal processing LSI) 14.

The signal processing unit 14 executes signal processing in a general camera, for example, white balance (WB) adjustment, gamma correction, and the like, to generate an output image, in other words, an image (LV image) to be displayed on the display unit 21, and stores the image in a memory 15.

The display unit 21 displays the LV image stored in the memory 15.

The display unit 21 includes, for example, an LCD, an EVF, or the like, and can be confirmed by the image-capturing person.

Next, description will be made for the FIG. 1B, data processing example at time of execution of image-capturing processing (at time of execution of capture image (CAP) recording processing).

When the image-capturing person operates (presses) the release button (shutter button), the processing of FIG. 1B is performed.

When the image-capturing person operates (presses) the release button (shutter button), light incident through the optical lens 11 is incident on an imaging unit, for example, the imaging element 12 including a CMOS image sensor or the like, and exposure processing is started.

However, as described above, there is a certain time interval, in other words, a release lag (release time lag), after the release button (shutter button) is pressed until the exposure processing in the imaging element 12 is started.

As described above, although there is a slight difference depending on the camera, the release lag is about 15 msec to 30 msec in many cameras.

When the exposure processing in the imaging element 12 ends, the imaging element 12 outputs the image data obtained by photoelectric conversion to the AD conversion unit 13. Note that, the output image in this case is an image for recording (CAP image) to be recorded and saved in a recording unit 22.

The image for recording (CAP image) is an image having a high number of pixels reflecting the number of pixels of the imaging element 12. The CAP image is an image of a high number of pixels having a larger number of pixels than those of the image for displaying (LV image) described with reference to (1).

Arrows of the LV image illustrated in FIG. 1A are indicated thin, arrows of the CAP image illustrated in FIG. 1B are indicated thick, and the high/low of the number of pixels is indicated by the thickness of the arrow.

The AD conversion unit 13 executes A/D conversion of an input signal, in other words, processing of converting an analog signal into a digital signal, and inputs a digital value after conversion to the signal processing unit (signal processing LSI) 14.

The signal processing unit 14 executes signal processing in a general camera, for example, white balance (WB) adjustment, gamma correction, and the like, to generate an output image.

In this case, the signal processing unit 14 generates an image for recording (CAP image) having a high number of pixels to be stored in the recording unit 22, and moreover, also generates an image for displaying (LV image) to be displayed on the display unit 21 and stores the LV image in the memory 15.

The recording unit 22 stores the image for recording (CAP image) having a high number of pixels stored in the memory 15.

On the other hand, the display unit 21 displays the image for displaying (LV image) having a low number of pixels stored in the memory 15.

The above is the overview of the processing at the time of execution and non-execution of image capturing in the imaging apparatus.

Next, a temporal flow of these pieces of processing will be described with reference to timing charts illustrated in FIGS. 2A, 2B, 2C, 2D, 2E, 2F, and 2G and subsequent drawings.

FIGS. 2A, 2B, 2C, 2D, 2E, 2F, and 2G are timing charts illustrating a processing sequence in a case where the image for displaying (LV image) is displayed on the display unit of the imaging apparatus, and during the display, image-capturing processing is performed, and recording processing of the image for recording (CAP image) is performed.

Time passes from left to right.

FIGS. 2A, 2B, 2C, 2D, 2E, 2F, and 2G individually illustrates processing timings of the following.

FIG. 2A Imaging element input synchronization signal
FIG. 2B Exposure processing
FIG. 2C AD conversion processing
FIG. 2D Display image generation processing
FIG. 2E Recorded image generation processing
FIG. 2F Display unit input synchronization signal
FIG. 2G Display unit display image.

The FIG. 2A, imaging element input synchronization signal is a synchronization signal input to the imaging element 12 by control of a control unit of the imaging apparatus. In this example, the synchronization signal for each 8.3 msec is set to be input to the imaging element 12.

The imaging element 12 updates execution processing, such as the start of various types of processing and processing switching, in response to input of the synchronization signal. For example, the synchronization signal becomes a trigger of exposure processing start or end processing of the image for displaying (LV image) in the imaging element 12, and further becomes a trigger of AD conversion processing start or display image generation processing start.

Note that, in the example illustrated in FIGS. 2A, 2B, 2C, 2D, 2E, 2F, and 2G, the exposure processing of the image for displaying (LV image) in the imaging element 12 is not set to start at the time of input of the synchronization signals (ta2, ta4, . . . ), but is set to start after the lapse of a predetermined clock from the synchronization signal input.

The FIG. 2B, exposure processing illustrates exposure processing in the imaging element 12. LV1, LV2, LV3 . . . illustrated in respective triangles each indicate the exposure processing of the image for displaying (LV image) to be displayed on the display unit 21. CAP indicates exposure processing of the image for recording (CAP image) to be recorded in the recording unit 22.

The left end of each triangle corresponds to the exposure start time, and the right end corresponds to the exposure end time.

The FIG. 2C, AD conversion processing is AD conversion processing executed by the AD conversion unit 13 that inputs from the imaging element 11 an image of which exposure is completed in the imaging element 12.

The FIG. 2D, display image generation processing is generation processing of the image for displaying (LV image) executed by the signal processing unit 14 that inputs a digital signal as an AD conversion processing result of the AD conversion unit 13.

Note that, the FIG. 2C, AD conversion processing and the FIG. 2D, display image generation processing are illustrated in a setting executed in parallel in the timing chart.

For example, two boxes are illustrated side by side at the same timing, as a processing box for LV1.

This indicates that the data subjected to AD conversion in the AD conversion unit 13 is sequentially input to the signal processing unit 14, and display image generation is sequentially executed on the input data from the AD conversion unit 13 in the signal processing unit 14. In practice, the FIG. 2C, AD conversion processing is started slightly earlier, and the FIG. 2D, display image generation processing is started slightly later and ends.

The FIG. 2E, recorded image generation processing is generation processing of the image for recording (CAP image) executed by the signal processing unit 14 that inputs the digital signal as the AD conversion processing result of the AD conversion unit 13.

In FIGS. 2A, 2B, 2C, 2D, 2E, 2F, and 2G, it is indicated as a laterally elongated rectangular box after the FIG. 2A, imaging element input synchronization signal=ta5.

This means that it takes time to generate the recorded image (CAP image) having a high number of pixels.

The FIG. 2F, display unit input synchronization signal is a synchronization signal input to the display unit 21 by control of the control unit of the imaging apparatus. In this example, the synchronization signal for each 16.6 msec is set to be input to the display unit 21.

The display unit 21 performs processing such as switching of display images in response to input of the synchronization signal.

The FIG. 2G, display unit display image illustrates images displayed on the display unit 21.

LV1, LV2 . . . correspond to image frames 1 and 2 of the display image, and mean that the display frames are switched at intervals of 16.6 msec. In other words, the display unit 21 displays a moving image by a live view image (through image).

Next, details will be described of the FIG. 2B, exposure processing.

The FIG. 2B, exposure processing is the exposure processing in the imaging element 12.

In a case where the release button is not pressed by the image-capturing person and the image-capturing processing is not executed, the imaging element 12 performs exposure processing of the image for displaying (LV image) to be displayed on the display unit 21.

LV1, LV2, LV3 . . . of the respective triangles illustrated in the FIG. 2B, exposure processing of the figure indicate the exposure processing of each image frame of the image for displaying (LV image) to be displayed on the display unit 21.

In the example illustrated in the figure, a first image frame for displaying (LV1) is completed by the time of input of the FIG. 2A, imaging element input synchronization signal (ta1), and thereafter, the exposure image is set to be switched at ta3, ta5, ta7 . . . at intervals of 16.6 msec.

Note that, in the example illustrated in the figure, the exposure of the image for recording (CAP image) is set to be completed at the time of input of the synchronization signal (ta5).

This is processing performed by pressing of the release button by the image-capturing person, and in a case where the pressing of the release button by the image-capturing person is not performed, the exposure of the image for displaying (LV3) is set to be completed also at the time of input of the synchronization signal (ta5).

The sequence will be described from exposure to display processing of the image for displaying (LV).

As an example, the processing sequence will be described in accordance with the dotted line illustrated in a second image frame for displaying (LV2) illustrated in FIGS. 2A, 2B, 2C, 2D, 2E, 2F, and 2G.

As illustrated in the FIG. 2B, exposure processing, the second image frame for displaying (LV2) is completed by the time of input of the FIG. 2A, imaging element input synchronization signal (ta3), in the imaging element 12.

The imaging element 12 outputs a photoelectric conversion signal obtained as an exposure result of the imaging element 12 to the AD conversion unit 13 in response to the input of the FIG. 2A, imaging element input synchronization signal (ta3).

After the FIG. 2A, imaging element input synchronization signal (ta3), as illustrated in the FIG. 2C, AD conversion processing and the FIG. 2D, display image generation processing in the figure, the AD conversion processing of the AD conversion unit 13 and the display image generation processing in the signal processing unit 14 are performed.

When the generation processing of the image for displaying (LV2) illustrated in the FIG. 2D, display image generation processing is completed, the image for displaying (LV2) is stored in the memory 16, and thereafter, output to the display unit 21.

As described above, the display unit 21 updates the display image in response to the input of the FIG. 2F, display unit input synchronization signal.

As understood from the figure, the earliest FIG. 2F, display unit input synchronization signal after the completion of the generation processing of the image for displaying (LV2) illustrated in the FIG. 2D, display image generation processing is a synchronization signal (tb2).

The display unit 21 performs display by switching the display image from the image for displaying (LV1) corresponding to the preceding frame to the image for displaying (LV2) corresponding to the subsequent frame with the input of the synchronization signal (tb2) as a trigger.

The display unit 21 executes this display image switching processing periodically, at intervals of 16.6 msec in the example illustrated in the figure. With this processing, the display unit 21 displays a moving image in which the image frame is switched for each 16.6 msec.

Next, processing will be described of the image for recording (CAP image) of which the exposure processing is completed at the time of input of the FIG. 2A, imaging element input synchronization signal (ta5) illustrated in the figure.

The image for recording (CAP image) of which the exposure processing is completed at the time of input of the FIG. 2A, imaging element input synchronization signal (ta5) is exposure processing of the image for recording (CAP image) performed by operation of the release button before the previous imaging element input synchronization signal (ta4).

Specifically, the exposure processing of the image for recording (CAP image) is started after the input of the first FIG. 2A, imaging element input synchronization signal after the lapse of a predetermined release time lag from the operation of the release button before the imaging element input synchronization signal (ta4).

The processing timing will be described later with reference to FIGS. 3A 3B, 3C, 3D, and 3E.

First, with reference to FIGS. 2A, 2B, 2C, 2D, 2E, 2F, and 2G, the subsequent processing will be described of the image for recording (CAP image) of which the exposure processing is completed at the time of input of the FIG. 2A, imaging element input synchronization signal (ta5).

For the image for recording (CAP image), as illustrated in FIGS. 2A, 2B, 2C, 2D, 2E, 2F, and 2G, the FIG. 2B, exposure processing is completed by the time of input of the FIG. 2A, imaging element input synchronization signal (ta5).

After the FIG. 2A, imaging element input synchronization signal (ta5), as illustrated in the FIG. 2C, AD conversion processing and the FIG. 2D, display image generation processing, the AD conversion processing of the AD conversion unit 13 and the display image generation processing in the signal processing unit 14 are performed.

The FIG. 2C, AD conversion processing (capAD) of the AD conversion unit 13 is processing for the image for recording (CAP image) having a high number of pixels, and the processing time becomes longer than that of the image for displaying (LV image) having a low number of pixels.

The signal processing unit 14 executes the generation processing of the image for recording (CAP image) having a high number of pixels, and the image for displaying (LV image) having a low number of pixels, by using digital data corresponding to the image for recording (CAP image) having a high number of pixels and being AD conversion result data of the AD conversion unit 13.

This processing is processing between the FIG. 2A, imaging element input synchronization signals (ta5 to ta6).

These are (LV3) indicated as the FIG. 2D, display image generation processing, and (CAP) indicated as the FIG. 2E, recorded image generation processing.

The (CAP) indicated as the FIG. 2E, recorded image generation processing is generation processing of the image for recording having a high number of pixels, and the processing time becomes long.

Furthermore, the (LV3) indicated as the FIG. 2D, display image generation processing is executed as processing in which processing such as pixel thinning is performed from the image for recording (CAP image) having a high number of pixels and being AD conversion result data of the AD conversion unit 13, and an image having a low number of pixels for displaying is generated.

As understood from the figure, this processing is set to be completed by the display unit input synchronization signal (tb3), and the processing is performed to be in time for frame switching of the display image at intervals of 16.6 msec.

[2. Problem that Release Lag Changes Depending on Image-Capturing Timing]

Next, a problem will be described that the release lag changes depending on the image-capturing timing.

The problem will be described with reference to FIGS. 3A, 3B, 3C, 3D, and 3E.

Similarly to FIGS. 2A, 2B, 2C, 2D, 2E, 2F, and 2G described above, FIGS. 3A, 3B, 3C, 3D, and 3E are timing charts of the processing sequence in a case where the image for displaying (LV image) is displayed on the display unit of the imaging apparatus, and during the display, image-capturing processing is performed, and recording processing of the image for recording (CAP image) is performed.

Time passes from left to right.

Similarly to FIGS. 2A, 2B, 2C, 2D, 2E, 2F, and 2G, FIGS. 3A, 3B, 3C, 3D, and 3E individually illustrates the processing timings of the following.

FIG. 3A Imaging element input synchronization signal

FIG. 3B Exposure processing

FIG. 3C AD conversion processing

FIG. 3D Display image generation processing

FIG. 3E Recorded image generation processing

As two different timing image-capturing operations performed in a period of the FIG. 3A, imaging element input synchronization signals (ta1) to (ta2), FIGS. 3A, 3B, 3C, 3D, and 3E further illustrate two different timing image-capturing operations of image-capturing operation 1 (release operation 1) (ts1), and image-capturing operation 2 (release operation 2) (ts2).

This corresponds to a timing when the image-capturing person presses the release button.

The image-capturing operation 1 (release operation 1) is executed at time (ts1), and thereafter, the image-capturing operation 2 (release operation 2) is performed at time (ts2).

The image-capturing person thinks that different images of different timings according to respective timings have been captured and recorded.

However, as a result, images to be captured and recorded become the same images in the case of the image-capturing operation 1 (release operation 1) and the case of the image-capturing operation 2 (release operation 2).

A factor of this will be described with reference to FIGS. 3A, 3B, 3C, 3D, and 3E.

As described above, there is a certain time delay, in other words, a release lag (release time lag), after the release button (shutter button) is pressed until the exposure processing in the imaging element 12 is started.

As described above, although there is a slight difference depending on the camera, the release lag is about 15 msec to 30 msec in many cameras.

As described above, a professional image-capturing person or the like performs processing in which he/she confirms the display image of the display unit of the camera, and moreover, estimates an image after the lapse of the release lag, and then presses the release button (shutter button) at a pressing timing so that the image estimated is captured.

However, to capture an image assumed by the image-capturing person by controlling the pressing timing of the release button (shutter button) in this way is under the condition that the release lag is always constant.

However, in practice, the release lag may differ depending on the pressing timing of the release button.

This is because, for example, the processing timing of the imaging element is defined by synchronization signals at regular intervals.

A specific example of this will be described with reference to FIGS. 3A, 3B, 3C, 3D, and 3E.

When the image-capturing operation 1 (release operation 1) is executed at the time (ts1), predetermined exposure preparation processing is started.

The exposure preparation processing is time required for, for example, output processing of control signals to the imaging element and the signal processing unit from the control unit, setting processing based on control signals in the imaging element and the signal processing unit, and the like, and is almost constant time.

In the present embodiment, this exposure preparation processing time is set to 20 msec.

The exposure preparation processing time of 20 msec corresponds to the minimum value of the release lag, and the release lag cannot be made less than or equal to the exposure preparation processing time (20 msec).

When the image-capturing operation 1 (release operation 1) is executed at the time (ts1), the exposure preparation processing is started, and the exposure preparation processing ends after the lapse of 20 msec from the time (ts1).

The exposure preparation processing ends at time (ts1e) indicated at the right end of the box of [exposure preparation processing 1 (20 msec)] illustrated in FIGS. 3A, 3B, 3C, 3D, and 3E.

However, at the end time (ts1e) of the [exposure preparation processing 1 (20 msec)], the exposure processing in the imaging element 12 is not started immediately.

The imaging element 12 is configured to perform start and switching of the processing with the input of the FIG. 3A, imaging element input synchronization signal as a trigger, and the exposure processing is started after the input of the synchronization signal (ta4) that is the first FIG. 3A, imaging element input synchronization signal after the end time (ts1e) of the [exposure preparation processing 1 (20 msec)].

Note that, the imaging element 12 sets the period of exposure so that the exposure processing is completed by (ta5) next to the synchronization signal (ta4).

The period of exposure is determined on the basis of, for example, the shutter speed set by the user (image-capturing person), or the like.

In the example illustrated in FIGS. 3A, 3B, 3C, 3D, and 3E, the period of exposure is set so that the exposure is completed at the (CAP) indicated in the FIG. 3B, exposure processing, in other words, the synchronization signal (ta5), and the exposure processing of a captured image 201 is performed.

Next, a captured image will be described in a case where the image-capturing operation 2 (release operation 2) is executed at the time (ts2) that is a timing delayed from the time (ts1).

When the image-capturing operation 2 (release operation 2) is executed at the time (ts2), the exposure preparation processing is started, and the exposure preparation processing ends after the lapse of 20 msec from the time (ts2).

The exposure preparation processing ends at time (ts2e) indicated at the right end of the box of [exposure preparation processing 2 (20 msec)] illustrated in FIGS. 3A, 3B, 3C, 3D, and 3E.

However, at the end time (ts2e) of the [exposure preparation processing 2 (20 msec)], the exposure processing in the imaging element 12 is not started immediately.

As described above, the imaging element 12 is configured to perform start and switching of the processing with the input of the FIG. 3A, imaging element input synchronization signal as a trigger, and the exposure processing is started after the input of the synchronization signal (ta4) that is the first FIG. 3A, imaging element input synchronization signal after the end time (ts2e) of the [exposure preparation processing 2 (20 msec)].

Similarly to the above, the imaging element 12 sets the period of exposure so that the exposure processing is completed by (ta5) next to the synchronization signal (ta4).

The period of exposure is determined on the basis of, for example, the shutter speed set by the user (image-capturing person), or the like.

In the example illustrated in FIGS. 3A, 3B, 3C, 3D, and 3E, the period of exposure is set so that the exposure is completed at the (CAP) indicated in the FIG. 3B. exposure processing, in other words, the synchronization signal (ta5), and the exposure processing of the captured image 201 is performed.

As described above, in any case of the image-capturing operation 1 (release operation 1) and the image-capturing operation 2 (release operation 2) respectively having different timings, the period of exposure of the imaging element becomes a period of exposure set so that the exposure processing is completed by (ta5) next to the synchronization signal (ta4), and as a result, images to be captured and recorded become the same images in the case of the image-capturing operation 1 (release operation 1) and the case of the image-capturing operation 2 (release operation 2).

This means that even if the image-capturing timing, in other words, the operation timing of the release button is shifted, the captured images (recorded images) become the same with each other, and for example, in a case where a subject moving at high speed is image-captured, a problem is caused in which image capturing becomes impossible of an image at a timing when the user tries to perform image capturing.

[3. Embodiment in Which Acquisition of Captured Image According to Image-Capturing Execution Timing is Enabled]

Next, an embodiment will be described that solves the above-described problem and in which acquisition of a captured image according to the image-capturing execution timing is enabled.

First, with reference to FIG. 4, a configuration example will be described of an imaging apparatus 100 according to the present embodiment.

The imaging apparatus 100 illustrated in FIG. 4 includes an optical lens 101, an imaging element 102, an AD conversion unit 103, a signal processing unit (signal processing LSI) 104, a memory 105, a display unit (LCD/EVF) 106, a recording unit 107, an operation unit 108, and a control unit 110.

The operation unit 108 is an operation unit for performing user input, for example, a release button (shutter button), setting of an image-capturing aspect and an image-capturing mode, setting of a display image of the display unit 106, or the like.

Note that, the display unit 106 can also be made as a touch panel type and used as a user operation unit.

The control unit 110 inputs control signals and synchronization signals to components (the imaging element 102, . . . , the recording unit 107), and executes various types of processing control such as control of execution timing of processing of each component.

For example, the control unit 110 executes output control of a synchronization signal that defines a processing timing of the imaging element 102, output control of a synchronization signal that defines switching timing of the display image of the display unit 106, and the like.

Specifically, the control unit 110 includes a CPU or the like that executes processing according to a program stored in a storage unit (not illustrated).

The program includes, for example, a control program for image capturing, image recording, and image display processing, a synchronization signal output control program, and the like.

Light incident through the optical lens 101 is incident on an imaging unit, for example, an imaging element 102 including a CMOS image sensor or the like, and image data obtained by photoelectric conversion is output. Note that, the output image of the imaging element 102 is the image for displaying (LV image) having a low number of pixels to be displayed on the display unit 106 in a case where image-capturing processing is not executed, and is the image for recording (CAP image) having a high number of pixels to be stored in the recording unit 107 in a case where the image-capturing processing is executed.

The output image from the imaging element 102 is input to the AD conversion unit 103.

The AD conversion unit 103 executes A/D conversion of an input signal, in other words, processing of converting an analog signal into a digital signal, and inputs a digital value after conversion to the signal processing unit (signal processing LSI) 104.

The signal processing unit 104 executes signal processing in a general camera, for example, white balance (WB) adjustment, gamma correction, and the like, to generate the output image, in other words, at least one of the image for displaying (LV image) to be displayed on the display unit 106 or the image for recordings (CAP images) to be stored in the recording unit 107, and stores the image in the memory 105.

The display unit 106 displays the image for displaying (LV image) stored in the memory 105.

The display unit 106 includes, for example, an LCD, an EVF, or the like, and can be confirmed by the image-capturing person.

Furthermore, the recording unit 107 stores the image for recording (CAP image) stored in the memory 105.

Next, with reference to FIGS. 5A, 5B, 5C, 5D, 5E, 6A, 6B, 6C, 6D, and 6E, a generation sequence will be described of the image for recording (CAP image) in a case where the image-capturing processing is executed.

FIGS. 5A, 5B, 5C, 5D, 5E, 6A, 6B, 6C, 6D, and 6E are diagrams illustrating the exposure processing of the image recorded in a case where the two different image-capturing operations described above with reference to FIGS. 3A, 3B, 3C, 3D, and 3E are performed.

FIGS. 5A, 5B, 5C, 5D, and 5E are diagrams illustrating the exposure processing of the recorded image (CAP image) and the recorded image generation processing in a case where the image-capturing operation 1 (release operation 1) at the time (ts1) described with reference to FIGS. 3A, 3B, 3C, 3D, and 3E is performed.

FIGS. 6A, 6B, 6C, 6D, and 6E are diagrams illustrating the exposure processing of the recorded image (CAP image) and the recorded image generation processing in a case where the image-capturing operation 2 (release operation 2) at the time (ts2) described with reference to FIGS. 3A, 3B, 3C, 3D, and 3E is performed.

First, with reference to FIGS. 5A, 5B, 5C, 5D, and 5E, the exposure processing of the (CAP image) and the recorded image generation processing will be described in a case where the image-capturing operation 1 (release operation 1) at the time (ts1) is performed.

Similarly to FIGS. 3A, 3B, 3C, 3D, and 3E described above, FIGS. 5A, 5B, 5C, 5D, and 5E are timing charts of the processing sequence in a case where the image for displaying (LV image) is displayed on the display unit of the imaging apparatus, and during the display, image-capturing processing is performed, and recording processing of the image for recording (CAP image) is performed.

Time passes from left to right.

Similarly to FIGS. 3A, 3B, 3C, 3D, and 3E, FIGS. 5A, 5B, 5C, 5D, and 5E individually illustrates the processing timings of the following.

FIG. 5A Imaging element input synchronization signal
FIG. 5B Exposure processing
FIG. 5C AD conversion processing
FIG. 5D Display image generation processing
FIG. 5E Recorded image generation processing FIG. 5A further illustrates the image-capturing operation 1 (release operation 1) (ts1) performed in the period of the imaging element input synchronization signals (ta1) to (ta2).

In other words, the time ts1 is a timing when the image-capturing person presses the release button.

When the image-capturing operation 1 (release operation 1) is executed at the time (ts1), predetermined exposure preparation processing is started.

As described above, the exposure preparation processing is time required for, for example, output processing of control signals to the imaging element and the signal processing unit from the control unit, setting processing based on control signals in the imaging element and the signal processing unit, and the like, and is almost constant time, and in the present embodiment, the exposure preparation processing time is set to 20 msec.

The exposure preparation processing time of 20 msec corresponds to the minimum value of the release lag, and the release lag cannot be made less than or equal to the exposure preparation processing time (20 msec).

When the image-capturing operation 1 (release operation 1) is executed at the time (ts1), the exposure preparation processing is started, and the exposure preparation processing ends after the lapse of 20 msec from the time (ts1).

The exposure preparation processing ends at the time (ts1e) indicated at the right end of the box of [exposure preparation processing 1 (20 msec)] illustrated in FIGS. 5A, 5B, 5C, 5D, and 5E.

In the present embodiment, at the end time (ts1e) of the [exposure preparation processing 1 (20 msec)], the exposure processing in the imaging element 102 is immediately started.

To immediately start the exposure processing in the imaging element 102, the control unit 110 outputs a first additional synchronization signal (ta-x4) 211 to the imaging element 102.

As described above, the imaging element 102 is configured to perform start and switching of the processing with the input of the FIG. 5A, imaging element input synchronization signal as a trigger, and can start the exposure processing of the image for recording (CAP image) in response to the first additional synchronization signal (ta-x4) 211 that is the first FIG. 5A, imaging element input synchronization signal after the end time (ts1e) of the [exposure preparation processing 1 (20 msec)].

The imaging element 102 starts the exposure processing of the image for recording (CAP image) in accordance with the first additional synchronization signal (ta-x4) 211 input from the control unit 110.

The period of exposure is determined on the basis of, for example, the shutter speed set by the user (image-capturing person), or the like.

The control unit 110 determines an end timing of the period of exposure depending on the period of exposure determined on the basis of the shutter speed or the like set by the user (image-capturing person), and further outputs a second additional synchronization signal (ta-x5) 212 to the imaging element 102 at the end timing of the period of exposure.

After the output of the second additional synchronization signal (ta-x5) 212, the control unit 110 performs switching to the synchronization signal output processing at specified intervals and continues the synchronization signal output processing. In other words, after the output of the second additional synchronization signal (ta-x5) 212, the control unit 110 outputs the synchronization signals (ta-x5, ta-x6, ta-x7 . . . ) at specified 8.3 msec intervals to the imaging element 102.

As illustrated in the figure, a period from the first additional synchronization signal (ta-x4) 211 to the second additional synchronization signal (ta-x5) 212 is the period of exposure of the captured image according to the image-capturing operation 1 (release operation 1) at the time (ts1), in other words, a captured image exposure period 210 indicated in the figure.

The first additional synchronization signal (ta-x4) 211, which is a start position of the captured image exposure period 210, is the time after the lapse of 20 msec, which is an exposure processing preparation period, from the execution time (ts1) of the image-capturing operation 1 (release operation 1).

The imaging element 102 outputs a photoelectric conversion signal obtained as an exposure result of the imaging element 102 to the AD conversion unit 103 in response to the input of the second additional synchronization signal (ta-x5) 212.

Thereafter, after the second additional synchronization signal (ta-x5) 212,

AD conversion processing in the AD conversion unit 103, and image for recording (CAP image) generation processing and image for displaying (LV image) generation processing in the signal processing unit 104 are executed.

Note that, the image for displaying (LV image) generation processing in the signal processing unit 104 is set to be completed in a period from the second additional synchronization signal (ta-x5) 212 until the synchronization signal (ta-x6) after a specified synchronization signal interval (8.3 msec).

As described above, in the present embodiment, when the image-capturing operation 1 (release operation 1) is executed at the time (ts1), the exposure preparation processing is started, and the exposure preparation processing ends after the lapse of 20 msec from the time (ts1), and the control unit 110 outputs the first additional synchronization signal (ta-x4) 211 to the imaging element 102 at the end time (ts1e) of the [exposure preparation processing 1 (20 msec)].

With this processing, the imaging element 102 is enabled to immediately start the exposure processing.

In other words, with this configuration, the release time lag is the shortest time that coincides with the exposure preparation processing time 20 msec.

Next, with reference to FIGS. 6A, 6B, 6C, 6D, and 6E, a captured image will be described in a case where the image-capturing operation 2 (release operation 2) is executed at the time (ts2) that is a timing delayed from the time (ts1) described with reference to FIGS. 5A, 5B, 5C, 5D, and 5E.

Similarly to FIGS. 5A, 5B, 5C, 5D, and 5E, FIGS. 6A, 6B, 6C, 6D, and 6E individually illustrates the processing timings of the following.

FIG. 6A Imaging element input synchronization signal
FIG. 6B Exposure processing
FIG. 6C AD conversion processing
FIG. 6D Display image generation processing
FIG. 6E Recorded image generation processing FIG. 6A further illustrates the image-capturing operation 2 (release operation 2) (ts2) performed in the period of the imaging element input synchronization signals (tat) to (ta2).

Note that, the execution timing (ts2) of the image-capturing operation 2 (release operation 2) (ts2) is a timing later than the execution timing (ts1) of the image-capturing operation 1 (release operation 1) (ts1) described with reference to FIGS. 5A 5B, 5C, 5D, and 5E.

These operation times ts1 and ts2 are the same as the operation times ts1 and ts2 described with reference to FIGS. 3A, 3B, 3C, 3D, and 3E.

When the image-capturing operation 2 (release operation 2) is executed at the time (ts2), predetermined exposure preparation processing is started.

Similarly to the case of the processing described with reference to FIGS. 5A, 5B, 5C, 5D, and 5E, the exposure preparation processing time is set to 20 msec.

The exposure preparation processing time of 20 msec corresponds to the minimum value of the release lag, and the release lag cannot be made less than or equal to the exposure preparation processing time (20 msec).

When the image-capturing operation 2 (release operation 2) is executed at the time (ts2), the exposure preparation processing is started, and the exposure preparation processing ends after the lapse of 20 msec from the time (ts2).

The exposure preparation processing ends at the time (ts2e) indicated at the right end of the box of [exposure preparation processing 2 (20 msec)] illustrated in FIGS. 6A, 6B, 6C, 6D, and 6E.

In the present embodiment, at the end time (ts2e) of the [exposure preparation processing 1 (20 msec)], the exposure processing in the imaging element 102 is immediately started.

To immediately start the exposure processing in the imaging element 102, the control unit 110 outputs a first additional synchronization signal (ta-y4) 221 to the imaging element 102.

As described above, the imaging element 102 is configured to perform start and switching of the processing with the input of the FIG. 6A, imaging element input synchronization signal as a trigger, and can start the exposure processing of the image for recording (CAP image) in response to the first additional synchronization signal (ta-y4) 221 that is the first FIG. 6A, imaging element input synchronization signal after the end time (ts2e) of the [exposure preparation processing 2 (20 msec)].

Note that, an output timing of the first additional synchronization signal (ta-y4) 221 is a timing delayed from an output timing of the first additional synchronization signal (ta-x4) 211 described above with reference to FIGS. 5A, 5B, 5C, 5D, and 5E.

This time difference is equal to a time difference between the image-capturing operation 2 (release operation 2) illustrated in FIGS. 6A, 6B, 6C, 6D, and 6E and the image-capturing operation 1 (release operation 1) illustrated in FIGS. 5A, 5B, 5C, 5D, and 5E, in other words, ts2-ts1.

In other words, the period of exposure is also set to be shifted in accordance with a shift of the timing of the image-capturing operation.

The imaging element 102 starts the exposure processing of the image for recording (CAP image) in accordance with the first additional synchronization signal (ta-y4) 221 input from the control unit 110.

The period of exposure is determined on the basis of, for example, the shutter speed set by the user (image-capturing person), or the like.

Depending on the period of exposure determined on the basis of the shutter speed or the like set by the user (image-capturing person), the control unit 110 further outputs a second additional synchronization signal (ta-y5) 222 to the imaging element 102, at the end timing of the period of exposure.

After the output of the second additional synchronization signal (ta-y5) 222, the control unit 110 performs switching to the synchronization signal output processing at specified intervals and continues the synchronization signal output processing. In other words, after the output of the second additional synchronization signal (ta-y5) 222, the control unit 110 outputs the synchronization signals at specified 8.3 msec intervals to the imaging element 102.

As illustrated in the figure, a period from the first additional synchronization signal (ta-y4) 221 to the second additional synchronization signal (ta-y5) 222 is the period of exposure of the captured image according to the image-capturing operation 2 (release operation 2) at the time (ts2), in other words, a captured image exposure period 220 indicated in the figure.

The first additional synchronization signal (ta-y4) 221, which is a start position of the captured image exposure period 220, is the time after the lapse of 20 msec, which is an exposure processing preparation period, from the execution time (ts2) of the image-capturing operation 2 (release operation 2).

The imaging element 102 outputs a photoelectric conversion signal obtained as an exposure result of the imaging element 102 to the AD conversion unit 103 in response to the input of the second additional synchronization signal (ta-y5) 222.

Thereafter, after the second additional synchronization signal (ta-y5) 222,

AD conversion processing in the AD conversion unit 103, and image for recording (CAP image) generation processing and image for displaying (LV image) generation processing in the signal processing unit 104 are executed.

Note that, the image for displaying (LV image) generation processing in the signal processing unit 104 is set to be completed in a period from the second additional synchronization signal (ta-y5) 222 until the synchronization signal (ta-y6) after a specified synchronization signal interval (8.3 msec).

As described above, in the present embodiment, the exposure start time of the image for recording (CAP image) in the imaging element 102 is controlled to a time when the exposure preparation processing for a certain period (20 msec) ends after the image-capturing operation (release operation) is executed.

As a result, if the timing of the image-capturing operation (release operation) is different even slightly, the exposure start time of the image for recording (CAP image) corresponding to the image-capturing operation also becomes different.

In other words, with this configuration, as described above with reference to FIGS. 3A, 3B, 3C, 3D, and 3E, the problem is solved that the same exposure image is generated and recorded even if the timing of the image-capturing operation (release operation) is different.

The image-capturing person is enabled to reliably capture and record an image of a desired timing by performing image capturing in consideration of a certain release lag (in this example, 20 msec).

Note that, although a sequence of image display on the display unit 106 is omitted in FIGS. 5A, 5B, 5C, 5D, 5E, 6A, 6B, 6C, 6D, and 6E, the display sequence of the display image on the display unit 106 is not disturbed even if the processing described with reference to FIGS. 5A, 5B, 5C, 5D, 5E, 6A, 6B, 6C, 6D, and 6E is performed.

With reference to FIGS. 7A, 7B, 7C, 7D, 7E, 7F, 7G, 8A, 8B, 8C, 8D, 8E, 8F, and 8G, the sequence will be described of the image display on the display unit 106 in a case where the processing described with reference to FIGS. 5A, 5B, 5C, 5D, 5E, 6A, 6B, 6C, 6D, and 6E is executed.

FIGS. 7A, 7B, 7C, 7D, 7E, 7F, and 7G are diagrams illustrating the image-capturing processing described with reference to FIGS. 5A, 5B, 5C, 5D, and 5E, in other words, processing in a case where the image-capturing operation 1 (release operation 1) is executed at the time (ts1).

The imaging element 102 outputs a photoelectric conversion signal obtained as an exposure result of the imaging element 102 to the AD conversion unit 103 in response to the input of the second additional synchronization signal (ta-x5) 212.

Thereafter, after the second additional synchronization signal (ta-x5) 212, AD conversion processing in the AD conversion unit 103, and image for recording (CAP image) generation processing and image for displaying (LV image) generation processing in the signal processing unit 104 are executed.

The image for displaying (LV image) generation processing in the signal processing unit 104 is set to be completed in a period from the second additional synchronization signal (ta-x5) 212 until the synchronization signal (ta-x6) after a specified synchronization signal interval (8.3 msec).

As understood from FIGS. 7A, 7B, 7C, 7D, 7E, 7F, and 7G, the FIG. 7A, imaging element synchronization signal (ta-x6) is a timing before the FIG. 7F, display unit input synchronization signal (tb3), and the signal processing unit 104 completes generation of the next image for displaying (LV3) before (tb3) that is the display end timing of the image for displaying (LV2) on the display unit 106.

Thus, the display unit 106 can update the image for displaying from LV2 to LV3 at the time (tb3), and perform a normal image display sequence, in other words, moving image display by switching of the display image frame for each 16.6 msec without any problem.

FIGS. 8A, 8B, 8C, 8D, 8E, 8F, and 8G are diagrams illustrating the image-capturing processing described with reference to FIGS. 6A, 6B, 6C, 6D, and 6E, in other words, the processing in a case where the image-capturing operation 2 (release operation 2) is executed at the time (ts2).

The imaging element 102 outputs a photoelectric conversion signal obtained as an exposure result of the imaging element 102 to the AD conversion unit 103 in response to the input of the second additional synchronization signal (ta-y5) 222.

Thereafter, after the second additional synchronization signal (ta-y5) 222, AD conversion processing in the AD conversion unit 103, and image for recording (CAP image) generation processing and image for displaying (LV image) generation processing in the signal processing unit 104 are executed.

The image for displaying (LV image) generation processing in the signal processing unit 104 is set to be completed in a period from the second additional synchronization signal (ta-y5) 222 until the synchronization signal (ta-y6) after a specified synchronization signal interval (8.3 msec).

As understood from FIGS. 8A, 8B, 8C, 8D, 8E, 8F, and 8G, the FIG. 8A, imaging element synchronization signal (ta-y6) is a timing before the FIG. 8F, display unit input synchronization signal (tb3), and the signal processing unit 104 completes generation of the next image for displaying (LV3) before (tb3) that is the display end timing of the image for displaying (LV2) on the display unit 106.

Thus, the display unit 106 can update the image for displaying from LV2 to LV3 at the time (tb3), and perform a normal image display sequence, in other words, moving image display by switching of the display image frame for each 16.6 msec without any problem.

Thus, as described with reference to FIGS. 5A, 5B, 5C, 5D, 5E, 6A, 6B, 6C, 6D and 6E, the display sequence of the display image on the display unit 106 is not disturbed even if the exposure start time in the imaging element 102 is immediately executed after the lapse of a certain exposure preparation processing time (20 msec) from the image-capturing operation.

Note that, in the image display sequence of the display unit 106 described with reference to FIGS. 7A, 7B, 7C, 7D, 7E, 7F, 7G, 8A, 8B, 8C, 8D, 8E, 8F, and 8G, the timings of the two synchronization signals, FIGS. 7A and 8A, imaging element input synchronization signal, and FIGS. 7F and 8F, display unit input synchronization signal, deviate from each other before and after the capturing of the image for recording (CAP image).

For example, in FIGS. 7A, 7B, 7C, 7D, 7E, 7F, and 7G, before the capturing of the image for recording (CAP image), the timings of the FIG. 7A, imaging element input synchronization signal (ta2) and the FIG. 7F display unit input synchronization signal (tb1) coincide with each other, but after the capturing of the image for recording (CAP image), the timings of the FIG. 7A, imaging element input synchronization signal (ta10) and the FIG. 7F, display unit input synchronization signal (tb5) do not coincide with each other.

This means that, before and after the capturing of the image for recording (CAP image), a difference occurs in the interval of time from the capturing of the image for displaying (LV image) to the display on the display unit.

As described above, discomfort may be given to the user if the time from the capturing and generation processing of the image for displaying (LV image) to actual display of the display image on the display unit differs.

Furthermore, components such as the imaging element and the display unit control timings of various types of processing on the basis of the synchronization signals input to the components. Thus, if the relationship of the synchronization signals input to the components breaks down, it is necessary to have many variations of processing control, which may be disadvantageous in terms of management cost and quality.

Not to cause such a problem, for example, it is preferable to perform control to return, to an original relationship, the FIG. 7A, imaging element input synchronization signal and the FIG. 7F, display unit input synchronization signal after completion of the generation processing of the image for recording (CAP image).

Specific examples are illustrated in FIGS. 9A, 9B, 9C, 9D, 9E, 9F, 9G, 10A, 10B, 100, 10D, 10E, 10F, and 10G.

FIGS. 9A, 9B, 9C, 9D, 9E, 9F, and 9G are diagrams illustrating processing corresponding to FIGS. 7A, 7B, 7C, 7D, 7E, 7F, and 7G, in other words, the processing in a case where the image-capturing operation 1 (release operation 1) is executed at the time (ts1).

As illustrated in FIGS. 9A, 9B, 9C, 9D, 9E, 9F, and 9G, the FIG. 9A, imaging element input synchronization signal (ta-x10) after the completion of the generation processing of the image for recording (CAP image) is changed to coincide with the FIG. 9F display unit input synchronization signal (tb5).

It is a synchronization signal (ta-x10) 251 illustrated in FIGS. 9A, 9B, 9C, 9D, 9E, 9F, and 9G.

FIGS. 10A, 10B, 10C, 10D, 10E, 10F, and 10G are diagrams illustrating processing corresponding to FIGS. 8A, 8B, 8C, 8D, 8E, 8F, and 8G, in other words, the processing in a case where the image-capturing operation 2 (release operation 2) is executed at the time (ts2).

As illustrated in FIGS. 10A, 10B, 10C, 10D, 10E, 10F, and 10G, the FIG. 10A, imaging element input synchronization signal (ta-yl0) after the completion of the generation processing of the image for recording (CAP image) is changed to coincide with the FIG. 10F, display unit input synchronization signal (tb5).

It is a synchronization signal (ta-yl0) 261 illustrated in FIGS. 10A, 10B 10C, 10D, 10E, 10F, and 10G.

As illustrated in FIGS. 9A, 9B, 9C, 9D, 9E, 9F, 9G, 10A, 10B, 10C, 10D, 10E, 10F, and 10G, after the completion of the generation processing of the image for recording (CAP image), the control unit 110 shifts the timing of the FIGS. 9A and 10A imaging element input synchronization signal, and inputs the imaging element input synchronization signals 251 and 261 to the imaging element.

By performing such processing, the timings of the FIGS. 9A and 10A imaging element input synchronization signal and the FIGS. 9F and 10F, display unit input synchronization signal are maintained in a relationship similar to that before the capturing of the image for recording (CAP image).

Note that, in FIGS. 9A, 9B, 9C, 9D, 9E, 9F, 9G, 10A, 10B, 10C, 10D, 10E, 10F, and 10G, processing of controlling the timing of the FIGS. 9A and 10A, imaging element input synchronization signal is performed, but a setting of controlling the FIGS. 9F and 10F, display unit input synchronization signal may be performed.

Furthermore, the control timing of the synchronization signal is not limited to a timing after the completion of the image for recording (CAP image) generation processing, and the control may be performed at any timing as far as it is after the completion of the exposure of the image for recording (CAP image) even in the middle of the image for recording (CAP image) generation processing.

[4. Sequence of Processing Executed by Imaging Apparatus]

Next, with reference to a flowchart illustrated in FIG. 11, a synchronization signal output control sequence will be described for the imaging element executed in the control unit of the imaging apparatus.

The flow illustrated in FIG. 11 is a flow illustrating the output control sequence of the synchronization signal for the imaging element 102 executed by the control unit 110 of the imaging apparatus 100 illustrated in FIG. 4.

For example, the control unit 110 including a processor having a program execution function executes a program stored in advance in the memory of the imaging apparatus 100 to execute processing according to the flow.

Hereinafter, processing of each step will be described sequentially.

(Step S101)

First, in step S101, the control unit 110 of the imaging apparatus 100 determines whether or not image-capturing processing is executed, in other words, whether or not the release button is pressed by the user (image-capturing person). This is performed as input detection processing from the operation unit 108 in the control unit 110.

In a case where it is determined that the image-capturing processing (release button pressing) is executed, the processing proceeds to step S102, and in a case where it is determined that the image-capturing processing (release button pressing) is not executed, the processing proceeds to step S105.

(Step S102)

In a case where it is determined in step S101 that the image-capturing processing (release button pressing) is executed, the processing proceeds to step S102, and the control unit 110 executes exposure preparation processing in step S102.

The exposure preparation processing is time required for, for example, output processing of control signals to the imaging element 102 and the signal processing unit 104 from the control unit 110, setting processing based on control signals in the imaging element 102 and the signal processing unit 104, and the like, and is almost constant time.

In the present embodiment, this exposure preparation processing time is 20 msec.

(Step S103)

Next, in step S103, the control unit 110 outputs a first additional synchronization signal to the imaging element 102 at the end time of the exposure preparation processing.

The first additional synchronization signal corresponds to the first additional synchronization signals (ta-x4) and (ta-y4) described with reference to FIGS. 5A, 5B, 5C, 5D, 5E, 6A, 6B, 6C, 6D, and 6E.

In response to input of the first additional synchronization signal from the control unit 110, the imaging element 102 starts exposure processing of an image for recording (CAP image).

(Step S104)

Next, in step S104, the control unit 110 outputs a second additional synchronization signal to the imaging element after the end of the exposure processing for an exposure time corresponding to a user setting shutter speed, and thereafter, outputs a synchronization signal at a specified output interval (for example, 8.3 msec) to the imaging element.

Note that, the control unit 110 acquires in advance the exposure time corresponding to the user setting shutter speed. The exposure time corresponding to the user setting shutter speed is stored in the memory.

The second additional synchronization signal output in step S104 by the control unit 110 to the imaging element 102 corresponds to the second additional synchronization signals (ta-x5) and (ta-y5) described with reference to FIGS. 5A, 5B, 5C, 5D, 5E, 6A, 6B, 6C, 6D, and 6E.

In response to input of the second additional synchronization signal, the imaging element 102 outputs a photoelectric conversion signal obtained as an exposure result of the imaging element 102 to the AD conversion unit.

Thereafter, as processing after the output of the second additional synchronization signal, AD conversion processing in the AD conversion unit 103, image for recording (CAP image) generation processing and image for displaying (LV image) generation processing in the signal processing unit 104 are executed.

After the output of the second additional synchronization signal to the imaging element, the control unit 110 continuously outputs the synchronization signal at the specified output interval (for example, 8.3 msec) to the imaging element.

(Step S105)

On the other hand, in a case where it is determined in step S101 that the image-capturing processing (release button pressing) is not executed, the processing proceeds to step S105.

In step S105, the control unit 110 continuously outputs the synchronization signal at the specified output interval (for example, 8.3 msec) to the imaging element.

By executing the processing according to the flowchart illustrated in FIG. 11, the exposure start time of the image for recording (CAP image) in the imaging element 102 is set to the end time of the exposure preparation processing (20 msec) for a certain period after the image-capturing operation (release operation).

Thus, the image-capturing person is enabled to reliably capture and record an image of a desired timing by performing image capturing in consideration of a certain release lag (in this example, 20 msec).

[5. Other Embodiments]

Next, other embodiments will be described.

An example has been described above of the imaging apparatus that executes the processing of the present disclosure with reference to FIG. 4.

The processing of the present disclosure is also applicable to an imaging apparatus having a configuration different from the configuration of the imaging apparatus 100 illustrated in FIG. 4.

Figure 12:
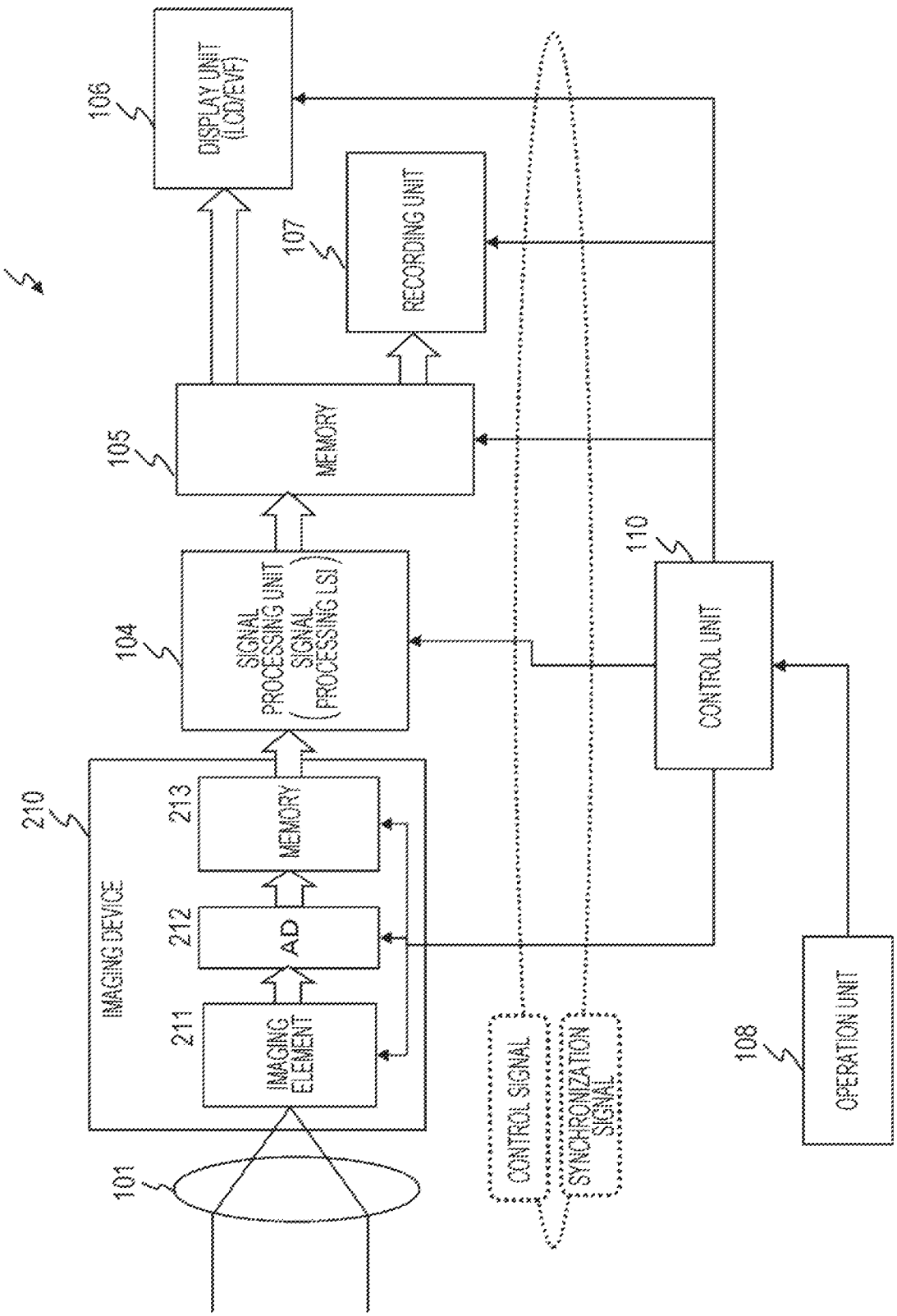
FIG. 12 is a diagram illustrating a configuration example of the imaging apparatus.

FIG. 12 illustrates a configuration example of an imaging apparatus 200 having a configuration different from the configuration illustrated in FIG. 4 enabled to execute the processing of the present disclosure.

An imaging apparatus 200 illustrated in FIG. 12 includes an optical lens 101, an imaging element device 210, a signal processing unit (signal processing LSI) 104, a memory 105, a display unit (LCD/EVF) 106, a recording unit 107, an operation unit 108, and a control unit 110.

The configuration other than the imaging element device 210 is similar to the configuration described above with reference to FIG. 4.

The imaging element device 210 of the imaging apparatus 200 illustrated in FIG. 12 includes an imaging element 211, an AD conversion unit 212, and a memory 213.

Light incident through the optical lens 101 is incident on the imaging element 211 of the imaging element device 210, for example, the imaging element 211 including a CMOS image sensor or the like, and the imaging element 211 outputs image data obtained by photoelectric conversion to the AD conversion unit 212 included in the imaging device 210.

The AD conversion unit 212 in the imaging device 210 executes A/D conversion of an input signal, in other words, processing of converting an analog signal into a digital signal, and stores a digital value after conversion in the memory 213 included in the same imaging device 210.

The signal processing unit (signal processing LSI) 104 performs signal processing by inputting digital data stored in the memory 213 of the imaging device 210.

Subsequent processing is the processing similar to the processing of the imaging apparatus 100 described above with reference to FIG. 4.

The imaging apparatus 200 illustrated in FIG. 12 is characterized in that the imaging device 210 including the imaging element 211, the AD conversion unit 212, and the memory 213 is included.

A control signal and a synchronization signal are input from the control unit 110 to the imaging device 210, and update processing is performed, such as start, change, and end of processing, on the basis of the synchronization signal.

Also in the configuration illustrated in FIG. 12, the processing can be performed according to the timing charts illustrated in FIGS. 5A, 5B, 5C, 5D, 5E, 6A, 6B, 6C, 6D, 6E, 7A, 7B, 7C, 7D, 7E, 7F, 8A, 8B, 8C, 8D, 8E, and 8F and the flowchart described with reference to FIG. 11.

The FIGS. 5B, 6B, 7B, and 8B, exposure processing of the timing chart is processing executed by the imaging element 211 of the imaging device 210 illustrated in FIG. 12.

Furthermore, the FIGS. 5C, 6C, 7C, and 8C, AD conversion processing is processing executed by the AD conversion unit 212 of the imaging device 210 illustrated in FIG. 12.

[6. Summary of Configuration of Present Disclosure]

In the above, the embodiments of the present disclosure have been described in detail with reference to specific embodiments. However, it is self-evident that those skilled in the art can make modifications and substitutions of the embodiments without departing from the gist of the present disclosure. In other words, the present invention has been disclosed in the form of exemplification, and should not be interpreted restrictively. To determine the gist of the present disclosure, the scope of claims should be taken into consideration.

Note that, the technology disclosed in this specification can have the following configuration.

(1) An imaging apparatus including:

an imaging element; and a control unit that performs output control of a synchronization signal that defines a processing timing of the imaging element, in which the control unit performs control to output a first additional synchronization signal to the imaging element at an end timing of exposure preparation processing started in response to image-capturing operation, and the imaging element starts exposure processing of a captured image corresponding to the image-capturing operation in response to input of the first additional synchronization signal.

(2) The imaging apparatus according to (1), in which the control unit performs control to output a second additional synchronization signal to the imaging element at an end timing of a period of exposure of the exposure processing of the captured image, and the imaging element starts output of a photoelectric conversion signal obtained by the exposure processing in response to input of the second additional synchronization signal.

(3) The imaging apparatus according to (1) or (2), in which the control unit performs control to output the synchronization signal to the imaging element at a specified output interval before output of the first additional synchronization signal.

(4) The imaging apparatus according to (2), in which the control unit performs control to output the synchronization signal to the imaging element at a specified output interval after output of the second additional synchronization signal.

(5) The imaging apparatus according to any of (1) to (4), in which the control unit determines the end timing of the period of exposure on the basis of setting information of a user.

(6) The imaging apparatus according to (5), in which the setting information includes information that sets a shutter speed.

(7) The imaging apparatus according to any of (2) to (6), in which the imaging element starts processing of outputting the photoelectric conversion signal obtained by the exposure processing to an AD conversion unit in response to the input of the second additional synchronization signal.

(8) The imaging apparatus according to any of (1) to (7), in which
the control unit
starts the exposure preparation processing in response to detection of image-capturing operation on an operation unit, and performs control to output the first additional synchronization signal to the imaging element at the end timing of the exposure preparation processing.

(9) The imaging apparatus according to any of (1) to (8), further including
a signal processing unit that generates an image for recording and an image for displaying on a display unit on the basis of an output signal of the imaging element, in which
the signal processing unit
executes generation processing of the image for displaying in a case where the image-capturing operation is not executed, and
executes generation processing of the image for recording and the image for displaying in a case where the image-capturing operation is executed.

(10) The imaging apparatus according to any of (1) to (9), further including
a display unit that displays a display image based on an output signal of the imaging element, in which
the control unit
performs, on the display unit, output control of a synchronization signal that defines a display image switching timing.

(11) The imaging apparatus according to any of (1) to (10), in which
the control unit,
after an end of a period of exposure of the exposure processing of the captured image,
performs control to return, to a relationship before image-capturing processing of the captured image, a relationship of input timing between
an imaging element input synchronization signal that defines the processing timing of the imaging element and
a display unit input synchronization signal that defines a display image switching timing of the display unit.

(12) The imaging apparatus according to any of (1) to (11), in which
the imaging element is included in an imaging device including as a constituent element:
an AD conversion unit that executes AD conversion processing on an output signal of the imaging element; and
a memory that stores a digital signal generated by the AD conversion unit.

(13) An image-capturing control method to be executed in an imaging apparatus,
the imaging apparatus including
an imaging element, and
a control unit that performs output control of a synchronization signal that defines a processing timing of the imaging element,
the image-capturing control method including:
by the control unit,
performing control to output a first additional synchronization signal to the imaging element at an end timing of exposure preparation processing started in response to image-capturing operation; and
by the imaging element, starting exposure processing of a captured image corresponding to the image-capturing operation in response to input of the first additional synchronization signal.

(14) A program that causes an imaging apparatus to execute image-capturing control processing,
the imaging apparatus including
an imaging element, and
a control unit that performs output control of a synchronization signal that defines a processing timing of the imaging element,
the program: causing the control unit
to perform control to output a first additional synchronization signal to the imaging element at an end timing of exposure preparation processing started in response to image-capturing operation; and
causing the imaging element to start exposure processing of a captured image corresponding to the image-capturing operation in response to input of the first additional synchronization signal.

Furthermore, the series of processing steps described in the specification can be executed by hardware, software, or a combination of both. In the case of executing processing by software, it is possible to install and execute a program recording the processing sequence in a memory in a computer incorporated in dedicated hardware, or to install and execute the program in a general-purpose computer capable of executing various types of processing. For example, the program can be recorded in a recording medium in advance. In addition to installing from the recording medium to the computer, the program can be received via a network such as a local area network (LAN) or the Internet, and installed in the recording medium such as a built-in hard disk.

Note that, the various types of processing described in the specification are not only executed in chronological order in accordance with the description but also may be executed in parallel or individually depending on the processing capability of the device that executes the processing or depending on necessity. Furthermore, in this specification, the term "system" is a logical group configuration of a plurality of devices, and is not limited to the one in which the devices of each configuration are in the same housing.

INDUSTRIAL APPLICABILITY

As described above, according to the configuration of an embodiment of the present disclosure, the apparatus and the method are implemented that enable capturing of an image according to a timing of image-capturing operation by making a release time lag constant.

Specifically, for example, the apparatus includes: an imaging element; and a control unit that performs output control of a synchronization signal that defines processing timing of the imaging element, in which the control unit outputs a first additional synchronization signal to the imaging element at an end timing of exposure preparation processing started in response to image-capturing operation. The imaging element starts exposure processing of a captured image corresponding to the image-capturing operation in response to input of the first additional synchronization signal. Moreover, the control unit outputs a second additional synchronization signal to the imaging element at an end timing of a period of exposure of the exposure processing of the captured image, and the imaging element starts output of a photoelectric conversion signal obtained by the exposure processing in response to input of the second additional synchronization signal.

With these pieces of processing, the apparatus and the method are implemented that enable capturing of an image according to a timing of image-capturing operation by making a release time lag constant.

REFERENCE SIGNS LIST

11 Optical lens
12 Imaging element
13 AD conversion unit
14 Signal processing unit
15 Memory
21 Display unit
22 Recording unit
101 Optical lens
102 Imaging element
103 AD conversion unit
104 Signal processing unit
105 Memory
106 Display unit
107 Recording unit
108 Operation unit
110 Control unit
200 Imaging apparatus
210 Imaging device
211 Imaging element
212 AD conversion unit
213 Memory

The invention claimed is:

1. An imaging apparatus comprising:
a processor configured to:
control output of a synchronization signal that defines a processing timing of an imaging element;
output a first additional synchronization signal to the imaging element at an end timing of an exposure preparation processing operation started in response to an image-capturing operation; and
output a second additional synchronization signal to the imaging element at an end timing of a period of exposure of an exposure processing operation of a captured image, and
the imaging element configured to:
start the exposure processing operation of the captured image corresponding to the image-capturing operation in response to input of the first additional synchronization signal; and
start output of a photoelectric conversion signal obtained by the exposure processing operation in response to input of the second additional synchronization signal.

2. The imaging apparatus according to claim 1, wherein the processor is further configured to control the output of the synchronization signal to the imaging element at a specified output interval before the output of the first additional synchronization signal.

3. The imaging apparatus according to claim 1, wherein the processor is further configured to control the output of the synchronization signal to the imaging element at a specified output interval after the output of the second additional synchronization signal.

4. The imaging apparatus according to claim 1, wherein the processor is further configured to determine the end timing of the period of exposure based on setting information of a user.

5. The imaging apparatus according to claim 4, wherein the setting information includes information that sets a shutter speed.

6. The imaging apparatus according to claim 1, wherein the imaging element is further configured to start output of the photoelectric conversion signal obtained by the exposure processing operation to the processor in response to the input of the second additional synchronization signal.

7. The imaging apparatus according to claim 1, wherein the processor is further configured to:
start the exposure preparation processing in response to detection of image-capturing operation on an operation unit, and
control the output of the first additional synchronization signal to the imaging element at the end timing of the exposure preparation processing.

8. The imaging apparatus according to claim 1, wherein the processor is further configured to:
generate an image for recording operation and an image for displaying operation on a display device based on an output signal of the imaging element,
execute generation processing operation of the image for displaying operation in a case the image-capturing operation is not executed, and
execute generation processing operation of the image for recording operation and the image for displaying operation in a case where the image-capturing operation is executed.

9. The imaging apparatus according to claim 1, wherein the processor is further configured to:
display a display image on a display device based on an output signal of the imaging element, and
control, on the display device, the output of a synchronization signal that defines a display image switching timing.

10. The imaging apparatus according to claim 1, wherein the processor is further configured to, after the end of the period of exposure of the exposure processing operation of the captured image, control to return, to a relationship before the image-capturing operation of the captured image, a relationship of input timing between an imaging element input synchronization signal and a display input synchronization signal,
the imaging element input synchronization signal indicates the processing timing of the imaging element, and
the display input synchronization signal that indicates a display image switching timing of a display device.

11. The imaging apparatus according to claim 1, wherein the imaging element is included in an imaging device, and the processor is further configured to:
execute an AD conversion processing operation on an output signal of the imaging element; and
store a digital signal generated by the processor.

12. An image-capturing control method to be executed in an imaging apparatus, the imaging apparatus including:
an imaging element, and
a processor configured to control output of a synchronization signal that defines a processing timing of the imaging element,
the image-capturing control method, comprising:
controlling, by the processor, output of a first additional synchronization signal to the imaging element at an end timing of an exposure preparation processing started in response to an image-capturing operation;
controlling, by the processor, output of a second additional synchronization signal to the imaging element at an end timing of a period of exposure of the exposure processing of a captured image;
starting, by the imaging element, exposure processing of the captured image corresponding to the image-capturing operation in response to input of the first additional synchronization signal; and starting, by the imaging element, output of a photoelectric conversion signal obtained by the exposure processing in response to input of the second additional synchronization signal.

13. A non-transitory computer-readable medium having stored thereon, computer-executable instructions which, when executed by a computer, cause the computer to execute operations, the operations comprising:
controlling, by a processor, output of a synchronization signal that defines a processing timing of an imaging element,
controlling, by the processor, output of a first additional synchronization signal to the imaging element at an end timing of an exposure preparation processing started in response to an image-capturing operation;
controlling, by the processor, output of a second additional synchronization signal to the imaging element at an end timing of a period of exposure of the exposure processing of a captured image;
starting, by the imaging element, exposure processing of the captured image corresponding to the image-capturing operation in response to input of the first additional synchronization signal; and
starting, by the imaging element, output of a photoelectric conversion signal obtained by the exposure processing in response to input of the second additional synchronization signal.

* * * * *